US012801950B2

(12) United States Patent
Heydarian Firouz Aba et al.

(10) Patent No.: US 12,801,950 B2
(45) Date of Patent: Nov. 17, 2026

(54) SYSTEMS, METHODS, AND COMPUTER PROGRAM PRODUCTS FOR EVALUATING MACHINE LEARNING MODEL PERFORMANCE

(71) Applicant: McMaster University, Hamilton (CA)

(72) Inventors: Mohammadreza Heydarian Firouz Aba, Niagara Falls (CA); Thomas Edward Doyle, Hamilton (CA); Reza Samavi, Toronto (CA)

(73) Assignee: McMaster University, Hamilton (CA)

( * ) Notice: Subject to any disclaimer, the term of this patent is extended or adjusted under 35 U.S.C. 154(b) by 379 days.

(21) Appl. No.: 18/436,182

(22) Filed: Feb. 8, 2024

(65) Prior Publication Data

US 2024/0273386 A1 Aug. 15, 2024

Related U.S. Application Data

(60) Provisional application No. 63/444,695, filed on Feb. 10, 2023.

(51) Int. Cl.
*G06N 5/04* (2023.01)

(52) U.S. Cl.
CPC .................................... *G06N 5/04* (2013.01)

(58) Field of Classification Search
CPC ................................ G06N 5/04; G06N 20/00
See application file for complete search history.

(56) References Cited

U.S. PATENT DOCUMENTS

| | | | | |
|---|---|---|---|---|
| 11,537,506 | B1 * | 12/2022 | Dasgupta | G06F 11/1476 |
| 11,556,746 | B1 * | 1/2023 | Dasgupta | G06N 20/00 |
| 2010/0241596 | A1 * | 9/2010 | Lee | G06N 5/04 706/46 |
| 2023/0099006 | A1 * | 3/2023 | Popescu | G06N 20/20 370/252 |

OTHER PUBLICATIONS

Krstinic, Damir, et al. "Multi-label classifier performance evaluation with confusion matrix." Computer Science & Information Technology 1.2020 (2020): 1-14. (Year: 2020).*
Gortler, Jochen, et al. "Neo: Generalizing confusion matrix visualization to hierarchical and multi-output labels." Proceedings of the 2022 CHI Conference on Human Factors in Computing Systems. 2022. (Year: 2022).*
Heydarian et al., "MLCM: Multi-Label Confusion Matrix", Digital Object Identifier, vol. 10 (2022), pp. 19083-19095.
(Continued)

*Primary Examiner* — Randall K. Baldwin

(57) ABSTRACT

A system, method and computer program product for evaluating a multi-label classification machine learning model. A model labelled dataset is received from the model and includes a plurality of data elements each labelled with zero or more model predicted labels of q potential classes. A multi-label confusion matrix is defined to include q+1 rows with q rows for true labels and 1 row for no true label and q+1 columns with q columns for predicted labels and 1 column for no predicted label. The matrix is populated by comparing the model labelled dataset with a true labelled dataset. At least one performance metric is calculated from the populated multi-label confusion matrix.

21 Claims, 3 Drawing Sheets

(56) References Cited

OTHER PUBLICATIONS

Altinel et al., “Semantic text classification: A survey of past and recent advances”, Information Processing and Management, vol. 54, No. 6 (2018), pp. 1129-1153.
Li et al., “A survey on sentiment analysis and opinion mining for social multimedia”, Multimedia Tools and Applications, vol. 78, No. 6 (2019), pp. 6939-6967.
Fatima et al., “Survey of Machine Learning Algorithms for Disease Diagnostic”, Journal of Intelligent Learning Systems and Applications, vol. 9, No. 1 (2017, pp. 1-16.
Martinez-Rodriguez et al., “Information Extraction meets the Semantic Web: A Survey”, Semantic Web, vol. 11, No. 2 (2020), pp. 255-335.
Zhang et al., “A Review on Multi-Label Learning Algorithms”, IEEE Transactions on Knowledge and Data Engineering, vol. 26, No. 8 (2014), pp. 1819-1837.
Sokolova et al., “A systematic analysis of performance measures for classification tasks”, Information Processing and Management, vol. 45, No. 4 (2009), pp. 427-437.
Tsoumakas et al., “Mining Multi-label Data”, Data Mining and Knowledge Discovery Handbook, 2nd Ed., ch. 34 (2010), pp. 667-685.
Pereira et al., “Correlation analysis of performance measures for multi-label classification”, Information Processing and Management, vol. 54, No. 3 (2018), pp. 359-369.
Spolaor et al., “A systematic review on experimental multi-label learning”, Institute of Mathematics and Computational Sciences, Chennai, India, Technical Report, ISSN-0103-2569, Feb. 2013.
Elkan et al., “The Foundations of Cost-Sensitive Learning”, Proceedings of the Seventeeth International Joint Conference on Artifical Intelligence (IJCAI), 2001, pp. 973-978.
Pedregosa et al., “Scikit-learn: Machine Learning in Python”, Journal of Machine Learning Research, vol. 12, No. 10 (2011), pp. 2825-2830.
Tsoumakas et al., “MULAN: A Java Library for Multi-Label Learning”, Journal of Machine Learning Research, vol. 12 (2011), pp. 2411-2414.
Read et al., “MEKA: A Multi-label/Multi-target Extension to WEKA”, Journal of Machine Learning Research, vol. 17, No. 21 (2016), pp. 1-5.
Dembczynski et al., “On label dependence and loss minimization in multi-label classification”, Mach Learn, vol. 88, No. 1 (2012), pp. 5-45.
Waegeman et al., “On the Bayes-Optimality of F-Measure Maximizers”, Journal of Machine Learning Research, vol. 15 (2014), pp. 3513-3568.
Koyejo et al., “Consistent Multilabel Classification”, Proc. 28th Int. Conf. Neural Inf. Process. Syst. (2015), pp. 3321-3329.
Madjarov et al., “An extensive experimental comparison of methods for multi-label learning”, Pattern Recognition, vol. 45, No. 9 (2012), pp. 3084-3104.
Lee et al., “An approach for multi-label classification by directed acyclic graph with label correlation maximization”, Information Sciences, vol. 351 (2016), pp. 101-114.
Wu et al., “A Unified View of Multi-Label Performance Measures”, Proceedings of the 34th International Conference on Machine Learning (2017), pp. 5778-5791.
Eftimov et al., “Performance Measures Fusion for Experimental Comparison of Methods for Multi-Label Classification”, Prc. AAAI, Spring Symp. Combining Mach. Learn. With Knowl. Eng. (AAAI-MAKE) (2019), pp. 1-10.
Bogaert et al., “Evaluating multi-label classifiers and recommender systems in the financial service sector”, European Journal of Operational Research, vol. 279 (2019), pp. 620-634.
Menon et al., “Multilabel reductions: what is my loss optimising?”, 33rd Conference on Neural Information Processing Systems (NeurIPS 2019) (2019), pp. 10600-10611.
Alday et al., “Classification of 12-lead ECGs: the PhysioNet/Computing in Cardiology Challenge 2020”, Physiol. Meas., vol. 41, No. 12 (2020), No. 124003.
Maiza, “Multi-Label Image Classification in TensorFlow 2.0”, available at <https://towardsdatascience.com/multi-label-image-classification-in-tensorflow-2-0-7d4cf8a4bc72> [retrieved May 9, 2024].

* cited by examiner

SYSTEMS, METHODS, AND COMPUTER PROGRAM PRODUCTS FOR EVALUATING MACHINE LEARNING MODEL PERFORMANCE

CROSS-REFERENCE TO RELATED APPLICATION(S)

This application claims priority to U.S. Provisional Patent Application No. 63/444,695, filed on Feb. 10, 2023. The entire content of U.S. 63/444,695 is incorporated herein by reference.

FIELD

The described embodiments relate to data processing systems and methods, and in particular to systems, methods, and computer program products for evaluating the performance of multi-label classification machine learning models.

BACKGROUND

As computer systems and data processing become more and more ubiquitous in society and daily life, continued improvements in data processing techniques are highly desirable. As data processing operations become more complex, and involve ever greater volumes of data, techniques for efficiently analyzing and processing large volumes of data are increasingly important. Many different types of machine learning algorithms and models have been developed to automatically process data, including large data volumes. Ensuring that the models provide sufficient levels of performance for a given application is a crucial aspect of model development.

Classification is a common type of task implemented using machine learning models. Classification tasks are often grouped into different types of classification problems including binary classification (classifying the elements of a dataset into one of two classes), multi-class classification (classifying the elements of a dataset into one of several classes), and multi-label classification (classifying the elements of a dataset using several classes where multiple nonexclusive labels may be assigned to each element). The type of model (e.g. binary, multi-class, or multi-label classifier) selected to perform a classification task will depend on the total number of classes in the data set and the number of assigned labels to each data element.

Multi-label classification is used to classify dataset from various different domains, including text, graphics, waveforms, and medical images. Examples of multi-label classification models have been developed for problems such as text categorization (see e.g. B. Altinel and M. C. Ganiz, "Semantic text classification: A survey of past and recent advances," *Information Processing and Management*, vol. 54, no. 6, pp. 1129-1153, 2018), multimedia content annotation (see e.g. Z. Li, Y. Fan, B. Jiang, T. Lei, and W. Liu, "A survey on sentiment analysis and opinion mining for social multimedia," *Multimedia Tools and Applications*, vol. 78, no. 6, pp. 6939-6967, 2019), disease recognition (see e.g. M. Fatima and M. Pasha, "Survey of machine learning algorithms for disease diagnostic," *Journal of Intelligent Learning Systems and Applications*, vol. 9, no. 1, pp. 1-16, 2017), and web mining (see e.g. J. L. Martinez-Rodriguez, A. Hogan, and I. Lopez-Arevalo, "Information extraction meets the semantic web: A survey," Semantic Web, vol. 11, no. 2, p. 255-335, 2020).

In developing a machine learning model to perform a classification task, several potential models are often developed and then evaluated to identify the model that provides the best performance. Each classification method is dependent on many factors such as the dataset properties and hyper-parameters. Ensuring that the models can be properly evaluated is an important aspect of model development.

Evaluating the performance of classification models is particularly challenging for multi-label classification models. For these types of models, the overall accuracy or performance metrics of the classifier often offer incomplete insight for refining the model. Systems and methods that are capable of accurately and comprehensively evaluating the performance of multi-label classification models can enable improved models to be developed. Comprehensive evaluation of these models can also improve trust in the models, by providing an increased level of explainability of the results generated.

INTRODUCTION

The following is not an admission that anything discussed below is part of the prior art or part of the common general knowledge of a person skilled in the art.

In an aspect of the disclosure, there is provided a method of evaluating a multi-label classification machine learning model, the method comprising: receiving, by a processor, a model labelled dataset from the machine learning model, wherein the model labelled dataset comprises a plurality of data elements and a plurality of model predicted labels, wherein each data element in the model labelled dataset is associated by the machine learning model with zero or more model predicted labels, wherein each model predicted label is selected from amongst a plurality of potential labels, wherein the plurality of potential labels corresponds to q potential classes; defining, by the processor, a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label (NTL), and the q+1 columns comprise q columns for predicted labels wherein each of the columns in the q columns corresponds to one of the potential labels and 1 column for no predicted label (NPL); generating, by the processor, a populated multi-label confusion matrix for the machine learning model by: for each data element in the plurality of data elements: determining an element-specific combination of true and predicted labels by comparing the zero or more model predicted labels associated with that data element with zero or more true labels associated with that data element in a true labelled dataset, wherein the true labelled dataset comprises the plurality of data elements and a plurality of true labels, wherein each data element in the true labelled dataset is associated with zero or more true labels, wherein each true label is selected from amongst the plurality of potential labels; and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category; calculating, by the processor, at least one performance metric for the machine learning model from the populated multi-label confusion matrix; and outputting, by the processor, the at least one performance metric.

Generating the populated multi-label confusion matrix can include: for each correctly predicted true label in each element-specific combination of true and predicted labels, incrementing a matrix entry in the populated multi-label confusion matrix at the row and column location corresponding to that true label and predicted label; and for each element-specific combination of true and predicted labels that contains zero true labels and zero predicted labels, incrementing a matrix entry in the populated multi-label confusion matrix at the row and column location corresponding to the no true label row and the no predicted label column.

The plurality of label combination categories can include a first category, a second category, and a third category; each data element in the model labelled dataset for which each of the zero or more model predicted labels associated with that data element corresponds to a true label associated with that data element in the true labelled dataset can be assigned to the first category; each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, can be assigned to the second category; and each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, can be assigned to the third category.

The category specific incrementation algorithm for the first category can include, for each true label in each element-specific combination of true and predicted labels where that element-specific combination of true and predicted label omits a corresponding predicted label, incrementing a matrix entry in the populated multi-label confusion matrix at the row location corresponding to the potential label associated with that true label of the no predicted label column.

The category specific incrementation algorithm for the second category can include: for each predicted label in each element-specific combination of true and predicted labels where that element-specific combination of true and predicted label omits a corresponding true label, incrementing a matrix entry in the populated multi-label confusion matrix at every row location corresponding to any true label for the corresponding data element of the column corresponding to that predicted label; and for each predicted label in each element-specific combination of true and predicted labels that omits any and all true labels, incrementing a matrix entry in the populated multi-label confusion matrix at the no true label row of the column corresponding to that predicted label.

The category specific incrementation algorithm for the third category can include, for each predicted label in each element-specific combination of true and predicted labels where that element-specific combination of true and predicted label omits a corresponding true label, incrementing a matrix entry in the populated multi-label confusion matrix at every row location corresponding to one of the true labels in the at least one true label associated with that data element for which the element-specific combination of true and predicted label omits a corresponding predicted label of the column corresponding to that predicted label.

The method can include generating at least one model improvement recommendation based on the at least one performance metric, and outputting the at least one model improvement recommendation.

The method can include receiving a second model labelled dataset from a second multi-label classification machine learning model, wherein the second model labelled dataset comprises the plurality of data elements and a second plurality of model predicted labels; defining a second multi-label confusion matrix for the second multi-label classification machine learning model; generating a second populated multi-label confusion matrix for the second multi-label classification machine learning model; calculating the at least one performance metric for the second multi-label classification machine learning model from the second populated multi-label confusion matrix; and comparing the at least one performance metric for the second multi-label classification machine learning model and the at least one performance metric for the machine learning model; where generating the at least one model improvement recommendation comprises identifying a preferred model based on comparing the at least one performance metric for the second multi-label classification machine learning model and the at least one performance metric for the machine learning model.

Generating at least one model improvement recommendation can include: identifying, based on the at least one performance metric, at least one particular class of the q potential classes for which the machine learning model is underperforming relative to the other potential classes.

In an aspect of the disclosure, there is provided a system for evaluating a multi-label classification machine learning model, the system comprising: a processor; and a non-transitory storage medium having stored thereon a true labelled dataset, wherein the true labelled dataset comprises a plurality of data elements and a plurality of true labels, wherein each data element in the true labelled dataset is associated with zero or more true labels, wherein each true label is selected from amongst a plurality of potential labels, wherein the plurality of potential labels corresponds to q potential classes; wherein the processor is configured to: receive a model labelled dataset from the machine learning model, wherein the model labelled dataset comprises the plurality of data elements and a plurality of model predicted labels, wherein each data element in the model labelled dataset is associated by the machine learning model with zero or more model predicted labels, wherein each model predicted label is selected from amongst the plurality of potential labels; define a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label; generate a populated multi-label confusion matrix for the machine learning model by: for each data element in the plurality of data elements: determining an element-specific combination of true and predicted labels by comparing the zero or more model predicted labels associated with that data element with the zero or more true labels associated with that data element;

and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category; calculate at least one performance metric for the machine learning model from the populated multi-label confusion matrix; and output the at least one performance metric.

The processor can be configured to generate the populated multi-label confusion matrix by: for each correctly predicted true label in each element-specific combination of true and predicted labels, incrementing a matrix entry in the populated multi-label confusion matrix at the row and column location corresponding to that predicted label and true label; and for each element-specific combination of true and predicted labels that contains zero true labels and zero predicted labels, incrementing a matrix entry in the populated multi-label confusion matrix at the row and column location corresponding to the no true label row and the no predicted label column.

The plurality of label combination categories can include a first category, a second category, and a third category; and the processor can be configured to: assign each data element in the model labelled dataset for which each of the zero or more model predicted labels associated with that data element corresponds to a true label associated with that data element in the true labelled dataset to the first category; assign each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, to the second category; assign each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, to the third category.

The processor can be configured to implement the category specific incrementation algorithm for the first category by, for each true label in each element-specific combination of true and predicted labels where that element-specific combination of true and predicted label omits a corresponding predicted label, incrementing a matrix entry in the populated multi-label confusion matrix at the row location corresponding to the potential label associated with that true label of the no predicted label column.

The processor can be configured to implement the category specific incrementation algorithm for the second category by: for each predicted label in each element-specific combination of true and predicted labels where that element-specific combination of true and predicted label omits a corresponding true label, incrementing a matrix entry in the populated multi-label confusion matrix at every row location corresponding to any true label for the corresponding data element of the column corresponding to that predicted label; and for each predicted label in each element-specific combination of true and predicted labels that omits any and all true labels, incrementing a matrix entry in the populated multi-label confusion matrix at the no true label row of the column corresponding to that predicted label.

The processor can be configured to implement the category specific incrementation algorithm for the third category by, for each predicted label in each element-specific combination of true and predicted labels where that element-specific combination of true and predicted label omits a corresponding true label, incrementing a matrix entry in the populated multi-label confusion matrix at every row location corresponding to one of the true labels in the at least one true label associated with that data element for which the element-specific combination of true and predicted label omits a corresponding predicted label of the column corresponding to that predicted label.

The processor can be configured to generate at least one model improvement recommendation based on the at least one performance metric, and output the at least one model improvement recommendation.

The processor can be configured to: receive a second model labelled dataset from a second multi-label classification machine learning model, wherein the second model labelled dataset comprises the plurality of data elements and a second plurality of model predicted labels; define a second multi-label confusion matrix for the second multi-label classification machine learning model; generate a second populated multi-label confusion matrix for the second multi-label classification machine learning model; calculate the at least one performance metric for the second multi-label classification machine learning model from the second populated multi-label confusion matrix; compare the at least one performance metric for the second multi-label classification machine learning model and the at least one performance metric for the machine learning model; and generate the at least one model improvement recommendation by identifying a preferred model based on comparing the at least one performance metric for the second multi-label classification machine learning model and the at least one performance metric for the machine learning model.

The processor can be configured to generate the at least one model improvement recommendation by: identifying, based on the at least one performance metric, at least one particular class of the q potential classes for which the machine learning model is underperforming relative to the other potential classes.

In an aspect of this disclosure, there is provided a computer program product comprising a non-transitory computer-readable storing computer executable instructions, the computer executable instructions for configuring a processor to perform a method of evaluating a machine learning model, wherein the method comprises: receiving a model labelled dataset from the machine learning model, wherein the model labelled dataset comprises a plurality of data elements and a plurality of model predicted labels, wherein each data element in the model labelled dataset is associated by the machine learning model with zero or more model predicted labels, wherein each model predicted label is selected from amongst a plurality of potential labels, wherein the plurality of potential labels corresponds to q potential classes; defining a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label; generating a populated multi-label confusion matrix for the machine learning model by: for each data element in the plurality of data elements: determining an element-specific combination of true and predicted labels by comparing the zero or more model predicted labels associated with that data element with zero or more true labels associated with that data element in a true labelled dataset, wherein the true labelled dataset comprises the plurality of data elements and a plurality of true labels, wherein each data element in the true labelled dataset is associated with zero or more true labels, wherein each true label is selected from amongst the plurality of potential labels; and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category; calculating at least one performance metric for the machine learning model from the populated multi-label confusion matrix; and outputting the at least one performance metric.

The computer executable instructions can be further defined to configure the processor to perform a method for evaluating a machine learning model, where the method is described herein.

In an aspect of this disclosure, there is provided a method of evaluating a multi-label classification machine learning model, the method comprising: receiving, by a processor, a model labelled dataset from the machine learning model, wherein the model labelled dataset comprises a plurality of data elements and a plurality of model predicted labels, wherein each data element in the model labelled dataset is associated by the machine learning model with zero or more model predicted labels, wherein each model predicted label is selected from amongst a plurality of potential labels, wherein the plurality of potential labels corresponds to q potential classes; defining, by the processor, a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label; generating, by the processor, a populated multi-label confusion matrix for the machine learning model by comparing the model labelled dataset and a true labelled dataset, wherein the true labelled dataset comprises the plurality of data elements and a plurality of true labels, wherein each data element in the true labelled dataset is associated with zero or more true labels, wherein each true label is selected from amongst the plurality of potential labels; calculating, by the processor, at least one performance metric for the machine learning model from the populated multi-label confusion matrix; and outputting, by the processor, the at least one performance metric.

The populated multi-label confusion matrix can be generated by: for each data element in the plurality of data elements: determining an element-specific combination of true and predicted labels by comparing the zero or more model predicted labels associated with that data element with zero or more true labels associated with that data element in a true labelled dataset; and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category.

Generating the populated multi-label confusion matrix can include: for each correctly predicted true label in each element-specific combination of true and predicted labels, incrementing a matrix entry in the populated multi-label confusion matrix at the row and column location corresponding to that predicted label and true label; and for each element-specific combination of true and predicted labels that contains zero true labels and zero predicted labels, incrementing a matrix entry in the populated multi-label confusion matrix at the row and column location corresponding to the no true label row and the no predicted label column.

The plurality of label combination categories can include a first category, a second category, and a third category; each data element in the model labelled dataset for which each of the zero or more model predicted labels associated with that data element corresponds to a true label associated with that data element in the true labelled dataset can be assigned to the first category; each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, can be assigned to the second category; and each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, can be assigned to the third category.

The category specific incrementation algorithm for the first category can include, for each true label in each element-specific combination of true and predicted labels where that element-specific combination of true and predicted label omits a corresponding predicted label, incrementing a matrix entry in the populated multi-label confusion matrix at the row location corresponding to the potential label associated with that true label of the no predicted label column.

The category specific incrementation algorithm for the second category can include: for each predicted label in each element-specific combination of true and predicted labels where that element-specific combination of true and predicted label omits a corresponding true label, incrementing a matrix entry in the populated multi-label confusion matrix at every row location corresponding to any true label for the corresponding data element of the column corresponding to that predicted label; and for each predicted label in each element-specific combination of true and predicted labels that omits any and all true labels, incrementing a matrix entry in the populated multi-label confusion matrix at the no true label row of the column corresponding to that predicted label.

The category specific incrementation algorithm for the third category can include, for each predicted label in each element-specific combination of true and predicted labels where that element-specific combination of true and predicted label omits a corresponding true label, incrementing a matrix entry in the populated multi-label confusion matrix at every row location corresponding to one of the true labels in the at least one true label associated with that data element for which the element-specific combination of true and predicted label omits a corresponding predicted label of the column corresponding to that predicted label.

The method can include generating at least one model improvement recommendation based on the at least one performance metric, and outputting the at least one model improvement recommendation.

The method can include receiving a second model labelled dataset from a second multi-label classification machine learning model, wherein the second model labelled dataset comprises the plurality of data elements and a second plurality of model predicted labels; defining a second multi-label confusion matrix for the second multi-label classification machine learning model; generating a second populated multi-label confusion matrix for the second multi-label classification machine learning model; calculating the at least one performance metric for the second multi-label classification machine learning model from the second populated multi-label confusion matrix; and comparing the at least one performance metric for the second multi-label classification machine learning model and the at least one performance metric for the machine learning model; where generating the at least one model improvement recommendation comprises identifying a preferred model based on comparing the at least one performance metric for the second multi-label classification machine learning model and the at least one performance metric for the machine learning model.

Generating at least one model improvement recommendation can include: identifying, based on the at least one performance metric, at least one particular class of the q potential classes for which the machine learning model is underperforming relative to the other potential classes.

In an aspect of this disclosure, there is provided a system for evaluating a multi-label classification machine learning model, the system comprising: a processor; and a non-transitory storage medium having stored thereon a true labelled dataset, wherein the true labelled dataset comprises a plurality of data elements and a plurality of true labels, wherein each data element in the true labelled dataset is associated with zero or more true labels, wherein each true label is selected from amongst a plurality of potential labels, wherein the plurality of potential labels corresponds to q potential classes; wherein the processor is configured to: receive a model labelled dataset from the machine learning model, wherein the model labelled dataset comprises the plurality of data elements and a plurality of model predicted labels, wherein each data element in the model labelled dataset is associated by the machine learning model with zero or more model predicted labels, wherein each model predicted label is selected from amongst the plurality of potential labels; define a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label; generate a populated multi-label confusion matrix for the machine learning model by comparing the model labelled dataset and the true labelled dataset; calculate at least one performance metric for the machine learning model from the populated multi-label confusion matrix; and output the at least one performance metric.

The processor can be further configured to perform a method for evaluating a multi-label classification machine learning model, where the method is described herein.

In an aspect of this disclosure, there is provided a computer program product comprising a non-transitory computer-readable storing computer executable instructions, the computer executable instructions for configuring a processor to perform a method of evaluating a machine learning model, where the method is described herein.

It will be appreciated that the aspects and examples may be used in any combination or sub-combination.

BRIEF DESCRIPTION OF THE DRAWINGS

The drawings included herewith are for illustrating various examples of articles, methods, and apparatuses of the teaching of the present specification and are not intended to limit the scope of what is taught in any way.

Figure 1:
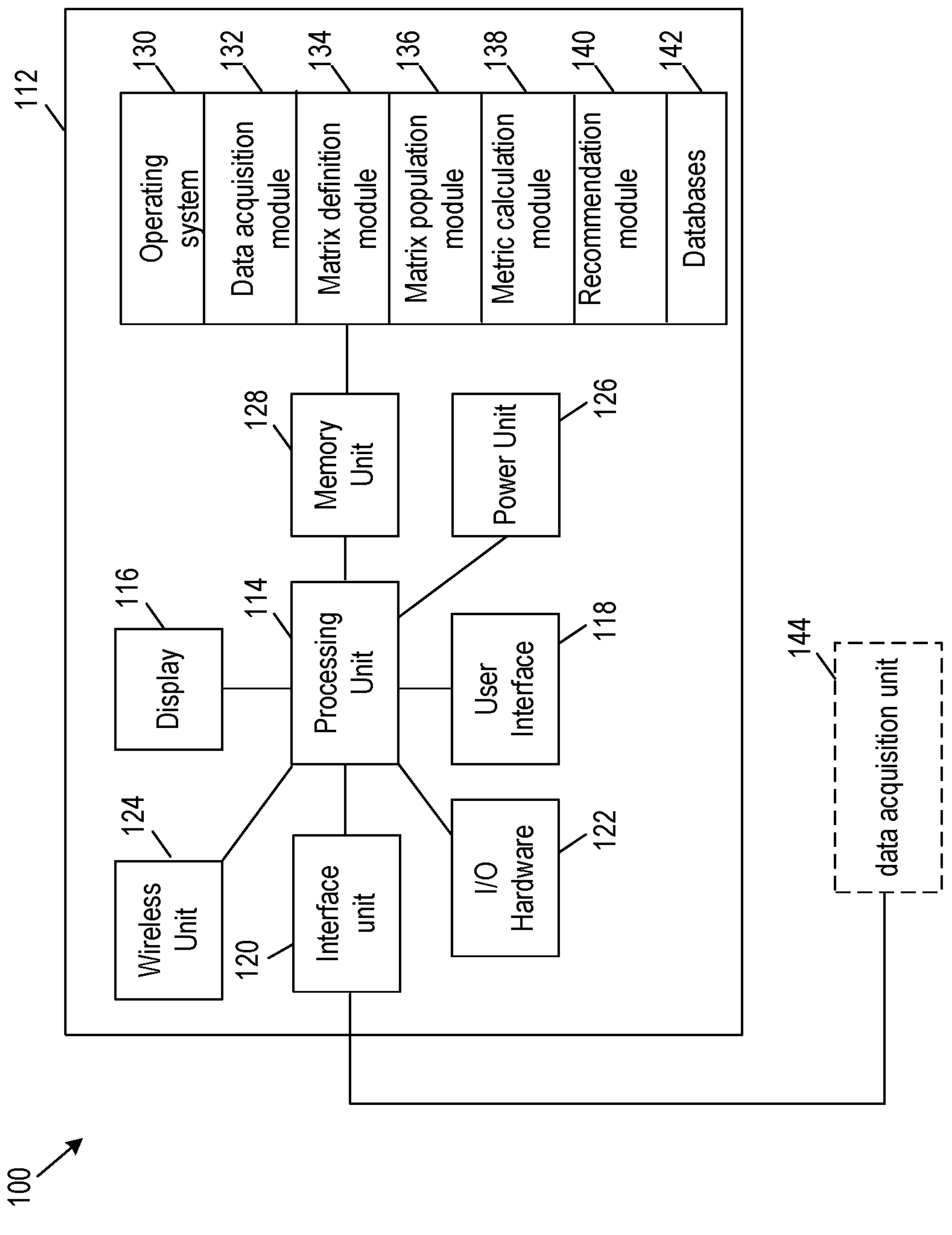
FIG. 1 is a block diagram of an example data processing system.

The drawings, described below, are provided for purposes of illustration, and not of limitation, of the aspects and features of various examples described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

Various systems or methods will be described below to provide an example of the claimed subject matter. No example described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an example that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example systems and methods described herein may be implemented as a combination of hardware or software. In some cases, the examples described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the examples described herein that may be implemented via software that is written in a high-level computer programming language such as object oriented programming. Accordingly, the program code may be written in C, C++, Python or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the examples described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present disclosure relates to systems, methods and computer program products that can provide a comprehensive evaluation of performance for multi-label classifiers. Concise and unambiguous assessment of a machine learning algorithm is key to classifier design and performance improvement. For binary and multi-class classifiers, where each element can only be labeled as one class, methods exist to assess performance by quantifying the classification overlap. However, for multi-label classifiers, where each element can be labeled with more than one class, there is no defined method to quantify classification overlap. This presents challenges in evaluating and improving the performance of multi-label classifiers.

Existing methods to assess multi-label classifiers tend to involve calculating performance averages, such as hamming loss, accuracy, subset accuracy, precision, recall, and $F^{\beta}$score (F-score). While these metrics may provide a general representation of each class and overall performance, the aggregate nature of these performance metrics results in ambiguity when identifying false negatives (FN) and false positives (FP) associated with each class. In particular, existing aggregate metrics for multi-label classification may provide an indication of the overall performance of a classifier, but are unable to evaluate the distribution of incorrectly classified elements.

The present disclosure describes systems, methods and computer program products that can accurately and comprehensively evaluate the performance of a multi-label classifier, including accurately identifying false negative (FN) and false positive (FP) results for all classes.

As explained herein, a two-dimensional confusion matrix is provided that can be used to evaluate a multi-label classifier (referred to herein as a multi-label confusion matrix or MLCM). The MLCM can properly account for all combinations of true and predicted labels. Performance metrics such as FN, FP, true positive (TP), and true negative (TN) results can be accurately extracted from the MLCM defined in accordance with the present disclosure. This can allow for further statistical calculations of performance metrics such as precision, recall, and F-score to be performed.

The multi-label confusion matrix defined in accordance with the present disclosure can assist in the development of multi-label classifiers by providing accurate and comprehensive performance metrics usable to assess overall model performance and identify specific areas for improvement. The multi-label confusion matrix may also be used to define a weight matrix for cost sensitive loss metrics (see e.g. C. Elkan, "The foundations of cost-sensitive learning," in *Proceedings of the Seventeenth International Joint Conference on Artificial Intelligence* (*IJCAI*'01), 2001), especially for imbalanced data sets.

The multi-label confusion matrix can be defined based on the characteristics of the classification task being performed by the multi-label classifier. The multi-label confusion matrix can be defined to include a number of rows and a number of columns that is based on the number of classes into which elements can be classified by the multi-label classifier. In particular, the multi-label confusion matrix can be defined to include one row and one column for each class as well as an additional row and an additional column to account for cases where there is no true label and/or no predicted label for some or all of the classes.

The entries of the multi-label confusion matrix can be calculated based on the combination of true and predicted labels assigned to each element of the dataset. Each element of the dataset can be assigned to a particular category based on the combination of true and predicted labels assigned to that element. The entries of the multi-label confusion matrix can then be calculated by applying category-specific algorithms to the various combinations of labels assigned to the elements in each category.

Data Processing System

The following is a general description of a data processing system and other features set out herein that may be used by itself or in combination with one or more examples disclosed herein, including a data processing method. The following description contains various features of a data processing system that may be used individually or in any combination or sub-combination.

Referring now to FIG. 1, there is provided is a block diagram of a data processing system 100 in accordance with an example. Data processing system 100 may be used to evaluate the performance of machine learning models, identify potential improvements for machine learning models, and generate recommendations for machine learning model development. Data processing system 100 may also be used to perform other data processing applications, such as data modelling and data analysis.

The data processing system 100 includes a data processing unit 112. The data processing unit 112 has at least one input for receiving labelled data from a machine learning model, at least one processing unit for comparing the model labelled data with true labelled data, generating a confusion matrix for a multi-label classification model, populating the confusion matrix based on the comparison of the model labelled data and the true labelled data, calculating performance metrics for the machine learning model based on the populated confusion matrix; and at least one output for displaying the multi-label confusion matrix, performance metrics and/or other performance related data and/or recommendations based on the performance metrics.

The system 100 further includes several power supplies (not all shown) connected to various components of the data processing system 100 for providing power thereto as is commonly known to those skilled in the art.

In general, a user may interact with the data processing unit 112 to provide true labelled data and model labelled data from an internal or external data source, or directly from a data acquisition unit 144 coupled to the data processing unit 112. The user can provide commands to the data processing unit 112 to define operations to be performed on the labelled data to generate desired output data. After the labelled data and commands are received, the data processing unit 112 can determine a confusion matrix, populate the confusion matrix using the labelled data, and calculate performance metrics to be displayed, stored, or further processed or analyzed. The user may also use the data processing unit 112 to evaluate the performance of one or more machine learning models and determine how to further develop the model(s) in order to improve model performance.

In the example illustrated, the data processing unit 112 includes a processing unit 114, a display 116, a user interface 118, an interface unit 120, Input/Output (I/O) hardware 122, a wireless unit 124, a power unit 126, and a memory unit 128. Optionally, the system 100 may further include a data acquisition unit 144, for example when initial input data is to be obtained from analysis of external data or objects.

The processing unit 114 controls the operation of the data processing unit 112 and can be a suitable computer processor, such as a general purpose microprocessor. For example, the processing unit 114 may be a high performance processor. In other cases, the processing unit 114 may include other types of controllers, such as a field programmable gate array, application specific integrated circuit, microcontroller, or other suitable computer processor or digital signal processor that can provide sufficient processing power depending on the configuration and operational requirements of the data processing system 100.

Alternately or in addition, the processing unit 114 may include more than one processor with each processor being configured to perform different dedicated tasks, or to perform various processing tasks in parallel. Alternately or in addition, specialized hardware can be used to provide some of the functions provided by the processing unit 114. Optionally, the processing unit 114 may be provided by a plurality of distributed processors operable to communicate over a network, such as the Internet. Optionally, the data processing unit 112 may be coupled to a plurality of processing units 114, and may distribute operations between greater or fewer numbers of processing units 114 depending on the data processing requirements of a particular application.

The data processing system 100 may include a plurality of data processing units 112 that can be connected by a data communication network. The data processing units 112 may include a plurality of local data processing units, and may also include a network of remotely connected data processing units.

Processor 114 is coupled, via a computer data bus, to memory unit 128. Memory 128 may include both volatile memory (e.g. RAM) and non-volatile memory (e.g. ROM, one or more hard drives, one or more flash drives or some other suitable data storage elements such as disk drives, etc.). Non-volatile memory stores computer programs consisting of computer-executable instructions, which may be loaded into volatile memory for execution by processor 114 as needed. It will be understood by those of skill in the art that references herein to data processing system 100 and/or data processing unit 112 as carrying out a function or acting in a particular way imply that processor 114 is executing instructions (e.g., a software program) stored in memory 128 and possibly transmitting or receiving inputs and outputs via one or more interface. Memory 128 may also store data input to, or output from, processor 114 in the course of executing the computer-executable instructions. Memory unit 128 may also store databases 142.

The memory unit 128 can be used to store the operating system 130. The operating system 130 provides various basic operational processes for the data processing unit 112. The data processing unit 112 may operate with various different types of operating system 130, such as Microsoft Windows™, GNU/Linux, or other suitable operating system.

The memory unit 128 can also store various user programs so that a user can interact with the data processing unit 112 to perform various functions such as, but not limited to, acquiring model labelled data and true labelled data, preprocessing data, analyzing the acquired or preprocessed data, processing the labelled data, displaying the processed data, as well as viewing, manipulating, communicating and storing data as the case may be.

As used herein, the terms "program", "software application" or "application" refers to computer-executable instructions, particularly computer-executable instructions stored in a non-transitory medium, such as a non-volatile memory, and executed by a computer processor such as processing unit 114. The computer processor, when executing the instructions, may receive inputs and transmit outputs to any of a variety of input or output devices to which it is coupled.

A software application may be associated with an application identifier that uniquely identifies that software application. In some cases, the application identifier may also identify the version and build of the software application. Within an organization, a software application may be recognized by a name by both the people who use it, and those that supply or maintain it.

The memory unit 128 on the data processing unit 112 may store a software application referred to herein as a data processing application. The data processing application can include software code for implementing a matrix generation module 134, a matrix population module 136, a metric calculation module 138, and a recommendation module 140. The memory unit 128 can also store software code for implementing an operating system 130, data acquisition module 132, and one or more databases 142 as well as various other programs.

Although shown separately from memory 128, it will be understood that the data processing applications (e.g. modules 134-140), and various other programs, may be stored in memory 128. In some cases, the data processing application may be a cloud-based application, rather than stored directly on data processing system 112. The data processing application may be configured to manage the performance of a plurality of processing operations for data processing system 112.

Examples of operations that can be performed by modules 134 to 140 will be described in greater detail with respect to FIGS. 2 and 3. Optionally, some of the modules may be combined, for example the matrix generation module 134 and matrix population module 136 may be provided as a combined confusion matrix generation module. Many components of the operator unit 112 can be implemented using one or more desktop computers, laptop computers, server computers, mobile devices, tablets, and the like.

The display 116 can be any suitable display that provides visual information and data as needed by various programs depending on the configuration of the data processing unit 112. For instance, the display 116 can be a cathode ray tube, a flat-screen monitor and the like if the data processing unit 112 is implemented using a desktop computer. In other cases, the display 116 can be a display suitable for a laptop, tablet or a handheld device such as an LCD-based display and the like, or more generally any sort of external display that is connectable to a processing unit 114. In particular, display 116 may display a graphical user interface (GUI) of the operating system 130, and various other programs operated by processing unit 114 such as a data processing application.

The user interface 118 can include input devices such as, for example, one or more of a mouse, a keyboard, a touch screen, a thumbwheel, a track-pad, a track-ball, a card-reader, voice recognition software and the like again depending on the particular implementation of the data processing unit 112. In some cases, some of these components can be integrated with one another.

The interface unit 120 can be any interface that allows the data processing unit 112 to communicate with other devices or systems. In some examples, the interface unit 120 may include at least one of a serial bus or a parallel bus, and a corresponding port such as a parallel port, a serial port or a USB port that provides USB connectivity. The busses may be external or internal. The busses may be at least one of a SCSI, USB, IEEE 1394 interface (FireWire), Parallel ATA, Serial ATA, PCIe, or InfiniBand. Other communication protocols may be used by the bus in other examples. The data processing unit 114 may use these busses to connect to the Internet, a Local Area Network (LAN), a Wide Area Network (WAN), a Metropolitan Area Network (MAN), a Wireless Local Area Network (WLAN), a Virtual Private Network (VPN), or a peer-to-peer network, either directly or through a modem, router, switch, hub or other routing or translation device.

I/O hardware 122 can include, but is not limited to, one or more input devices such as a keyboard, mouse, trackpad, touchpad, microphone, camera and various other input devices. I/O hardware 122 may also include one or more output devices in addition to display 116, such as a speaker, tactile feedback sensors, and a printer, for example.

The wireless unit 124 is optional and can be a radio that communicates utilizing CDMA, GSM, GPRS or Bluetooth protocol according to standards such as IEEE 802.11a, 802.11b, 802.11g, or 802.11n. The wireless unit 124 can be used by the data processing unit 112 to communicate with other devices or computers.

The power unit 126 can be any suitable power source that provides power to the data processing unit 112 such as, for example, a power adaptor or a rechargeable battery pack depending on the implementation of the data processing unit 112.

The data acquisition module 132 may be used to obtain initial input data, such as true labelled dataset and/or model labelled dataset from another processing system, a storage device, and/or data acquisition unit 144.

The matrix definition module 134 can define a multi-label confusion matrix for a given multi-label classifier. The multi-label confusion matrix can be defined based on the characteristics of the classification task being performed by the multi-label classifier. The multi-label confusion matrix can be defined to include a number of rows and a number of columns that is based on the number of classes into which elements can be classified by the multi-label classifier. In particular, the multi-label confusion matrix can be defined to include one row and one column for each class as well as an additional row and an additional column. For example, the matrix definition module 134 can be configured to define the multi-label confusion matrix as described in further detail herein below at step 230 of method 200.

The matrix population module 136 can be configured to populate the entries of the multi-label confusion matrix once the matrix has been defined. In particular, the matrix population module 136 can define the values that will be included at each location within the multi-label confusion matrix. The values can be defined based on the true and predicted labels associated with each of the data elements of the dataset that is being classified by the multi-label classifier. For example, the matrix population module 136 can be configured to populate the multi-label confusion matrix as described in further detail herein below at step 240 of method 200 (and in method 300).

The metric calculation module 138 can be configured to calculate performance metrics for the multi-label classifier. The performance metrics can be used to evaluate the performance of the multi-label classifier. The performance metrics may allow different classification models to be compared and/or to identify aspects of the classification task that can be improved within a given classification model.

The metric calculation module 138 can calculate various different types of performance metrics, including individual class metrics and overall model performance metrics. The performance metrics can be calculated from the values in the populated multi-label confusion matrix. For example, the metric calculation module 138 can be configured to calculate one or more performance metrics as described in further detail herein below at step 250 of method 200.

The recommendation module 140 may generate and output recommendations for model improvement. For example, the recommendation module 140 can be configured to compare the performance metric(s) generated for different models performing the same classification task in order to identify a preferred model. Alternatively or in addition, the recommendation module 140 can be configured to evaluate the performance metric(s) generated for one or more models to identify aspects of the classification task that are underperforming (e.g. classes that the model predicts incorrectly or fails to predict more often) and thus should be improved.

The operations performed by the modules 134 to 140 will be discussed in further detail herein below. It should be noted that the various modules 134 to 140 may be combined or further divided into other modules. For example the matrix generation module 134 and matrix population module 136 may be combined in some examples. The modules 134 to 140 are typically implemented using software, but there may be some instances in which at least some of these modules are implemented using FPGA or application specific circuitry.

The databases 142 can be used to store data for the system 110 such as system settings. The databases 142 can also store other information required for the operation of the programs stored in memory unit 128, such as the operating system 130 and modules 132-140 such as dynamically linked libraries and the like. The databases 142 may also be used to store true labelled data, model labelled data, confusion matrix data, performance metric data and so forth.

Optionally, database 142 is a relational database. Alternatively, database 142 may be a non-relational database, such as a key-value database, NoSQL database, or the like.

It should also be understood that some of the elements of the data processing unit 112, such as some or all of the memory 128 and/or processor 114 may be implemented using a combination of hardware and software resources, for instance using virtual machines and/or containers.

Data processing unit 112 may at times connect to external computers or servers via the Internet. For example, data processing unit 112 may connect to a software update server to obtain the latest version of a software application or firmware.

The data processing unit 112 can include at least one interface that the processing unit 114 can communicate with in order to receive or send information. This interface can be the user interface 118, the interface unit 120 or the wireless unit 124. For instance, the true labelled data, number and type of models being evaluated as well as data processing parameters that may be used by the system 100 may be inputted by a user or otherwise selected through the user interface 118 or this information may be received through the interface unit 120 from a computing device. The processing unit 114 can communicate with either one of these interfaces as well as the display 116 or the I/O hardware 122 in order to use this input information to process the model labelled data and present the performance data. In addition, users of the data processing unit 12 may communicate information across a network connection to a remote system for storage and/or further processing, and/or remote presentation of the output data.

A user can also use the data processing unit 112 to provide information needed for system parameters that are needed for proper operation of the system 100 such as system operating parameters. The user may also use the data processing unit 112 to identify the datasets of interest, model(s) being evaluated, and/or the type of performance metrics to be calculated for example.

The data processing system 100 is provided as an example and there may be other examples of the system 100 with different components or a different configuration of the components described herein.

Data Processing Method

The following is a general description of a data processing method and other features set out herein that may be used by itself or in combination with one or more examples disclosed herein, including a data processing system. The following description contains various features of a data processing method that may be used individually or in any combination or sub-combination.

Figure 2:
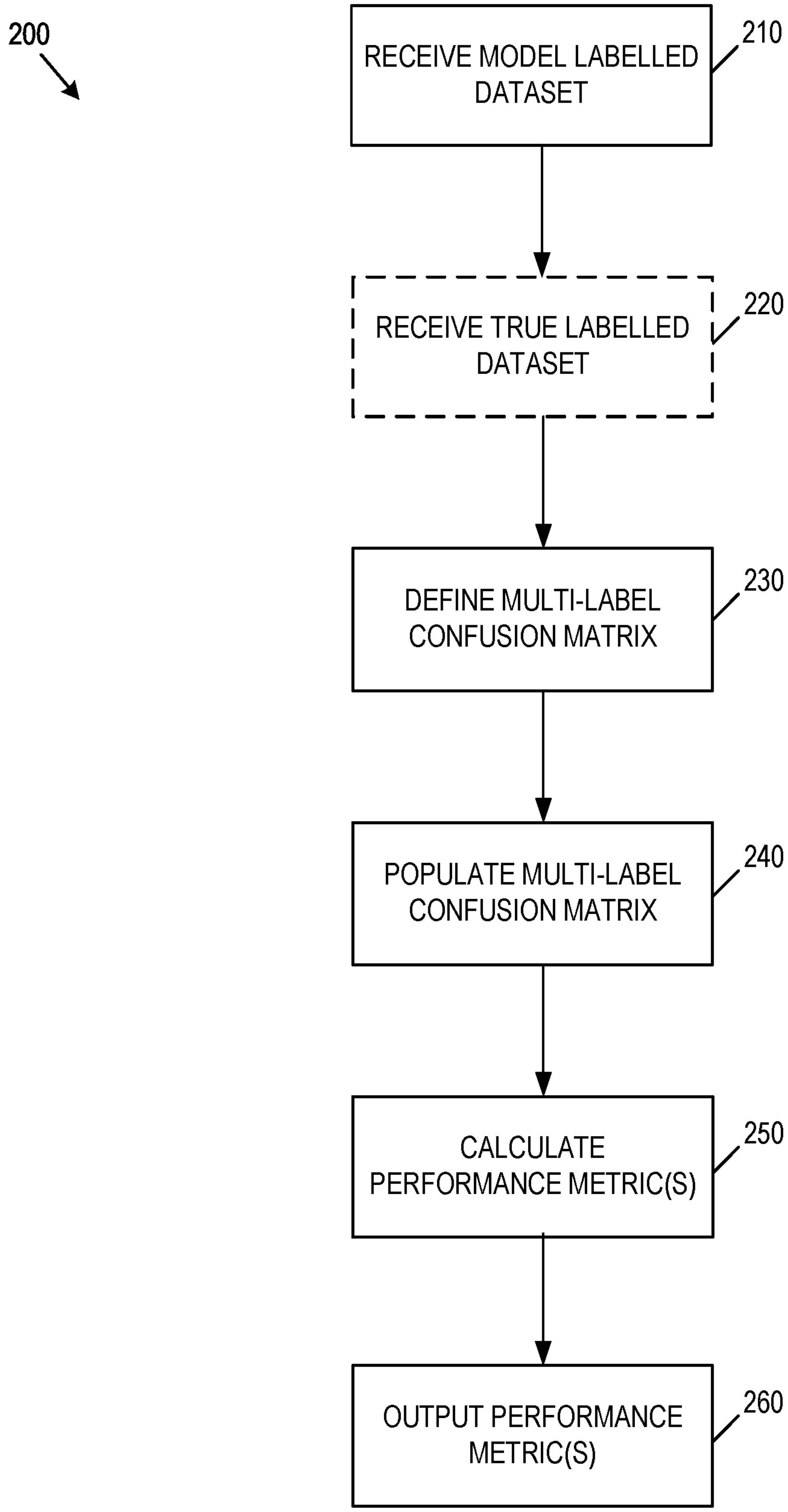
FIG. 2 is a flowchart illustrating an example process of evaluating a machine learning model.

Referring now to FIG. 2, shown therein is an example process 200 for evaluating a multi-label classification machine learning model. The example process 200 for evaluating a machine learning model shown in FIG. 2 uses a single confusion matrix to evaluate the performance of all classes considered by the multi-label classification machine learning model. The example process 200 may be implemented by various data processing systems, such as the example system 100 described herein above.

In the discussion that follows, the definitions below will be used to represent aspects of the methods described herein:

- i represents a data element of a dataset
- m represents the number of data elements in the dataset
- C represents a class to which a data element may be assigned
- q represents the total number of class to which a data element could be assigned
- $T_i$ represents the set of true labels/classes for data element i
- $T_{i1}$ represents the true labels/classes for data element that were predicted by the multi-label classifier (i.e. predicted true labels/classes)
- $T_{i2}$ represents the true labels/classes for data element that were not predicted by the multi-label classifier (i.e. not predicted true labels/classes)
- $P_i$ represents the set of predicted labels/classes (i.e. model assigned labels/classes) for data element i
- $P_{i1}$ represents the set of predicted labels/classes for data element i that correspond to true labels/classes (i.e. correctly predicted labels/classes)
- $P_{i2}$ represents the set of predicted labels/classes for data element i that do not correspond to true labels/classes (i.e. incorrectly predicted labels/classes)
- M represents the confusion matrix
- r represents the row of the confusion matrix
- c represents the column of the confusion matrix
- h(•) represents the classifier model To facilitate the understanding of process 200 (And process 300 described below), an example dataset containing nine elements is shown in Table 1. As shown below, Table 1 includes an example of a true labeled dataset and a model labelled dataset generated from a dataset containing nine data elements (elements 1-9) classified among three classes ($C_0$, $C_1$, $C_2$) by a multi-label classification model.

TABLE 1

Example of true and predicted labels

| Data Element # | Label Combination Category | True Labelled Dataset Co | C1 | C2 | Model Labelled Dataset Co | C1 | C2 |
|---|---|---|---|---|---|---|---|
| 1 | 1 | 1 | 1 | 0 | 1 | 1 | 0 |
| 2 | 1 | 1 | 1 | 1 | 1 | 0 | 1 |
| 3 | 1 | 0 | 0 | 0 | 0 | 0 | 0 |
| 4 | 2 | 1 | 0 | 0 | 1 | 1 | 1 |
| 5 | 2 | 1 | 1 | 0 | 1 | 1 | 1 |
| 6 | 2 | 0 | 0 | 0 | 0 | 1 | 1 |
| 7 | 3 | 1 | 0 | 0 | 0 | 1 | 1 |
| 8 | 3 | 1 | 1 | 0 | 1 | 0 | 1 |
| 9 | 3 | 1 | 1 | 0 | 0 | 0 | 1 |

At 210, a model labelled dataset can be received from the machine learning model. The model labelled dataset can include plurality of data elements and a plurality of model predicted labels.

The model labelled dataset generally refers to the output from a multi-label classification machine learning model after the model has labelled the data elements from an unlabeled dataset of interest. That is, the model labelled dataset can include data relating to each element in the dataset of interest as well as any and all labels assigned to those data elements by the machine learning model. The plurality of model predicted labels can thus include each label associated with each particular data element of the dataset.

The machine learning model can be defined as a multi-label classification model. The multi-label classification model can be defined to label each data element in a dataset of interest with zero or more model predicted labels. Each of the model predicted labels corresponds to a particular label from amongst a plurality of potential labels. The potential labels correspond to the different potential classes to which a data element can be assigned. In the context of a multi-label classification task, the machine learning model can be configured to assign each data element zero or more labels corresponding to zero or more classes associated (by the model) with the data element.

Table 1 illustrates an example of a model labelled dataset for nine data elements (elements 1-9). As shown in Table 1, each of the data elements has been associated by a multi-label classification model with zero or more labels corresponding to classes ($C_0$, $C_1$, $C_2$).

The model labelled dataset can be received by a data processing unit 112 from an external computing device, such as a remote computer or computers implementing the multi-label classifier e.g. via interface unit 120. Alternatively, the multi-label classifier may be implemented directly on the data processing unit and the model labelled dataset can be received directly as the output from the multi-label classifier once the classification task has been completed (or from storage e.g. on a database 142).

Optionally, at 220 a true labelled dataset can be received. The true labelled dataset can include the same plurality of data elements as the model labelled dataset and a plurality of true labels. Similar to the model labelled dataset, each data element in the true labelled dataset can be associated with zero or more true labels. Each of the true labels can be selected from amongst the plurality of potential labels used by the model.

The true labelled dataset represents the correct or "true" labels that should have been applied to the elements of the dataset. Optionally, the true labelled dataset may be (or may have been) defined by a user based on a manual evaluation and classification of the dataset.

Table 1 also illustrates an example of a true labelled dataset for the nine data elements (elements 1-9). As shown in Table 1, each of the data elements has zero or more true labels corresponding to classes ($C_0$, $C_1$, $C_2$).

As shown in FIG. 2, step 220 is optional. That is, there may be numerous cases where the true labelled dataset has already been received or is already stored on the data processing system. In such cases, the step of receiving the true labelled dataset may be omitted.

At 230, a multi-label confusion matrix for the machine learning model can be defined for the machine learning model. The multi-label confusion matrix can be defined to enable each and every potential class to be evaluated using a single confusion matrix. This can provide for an improved evaluation of the machine learning model.

The multi-label confusion matrix can be defined based on the number of classes involved in the classification task being performed by the multi-label machine learning model. Generally, the model can be defined to classify each element in a dataset into zero or more classes from a set of q potential classes, where q represents the number of potential classes. q is an integer greater than 1.

The multi-label confusion matrix can be defined to include a number of rows and a number of columns that is based on the number of classes into which elements can be classified by the multi-label classifier. In particular, the multi-label confusion matrix can be defined to include one row and one column for each class as well as an additional row and an additional column representing no class. That is, multi-label confusion matrix can be defined to include q+1 rows and q+1 columns for a model defined to classify data elements into q potential classes.

In the multi-label confusion matrix, the q+1 rows can include q rows for true labels. Each of the rows in the q rows can correspond to one of the potential labels/classes. The q+1 rows can also include 1 row for no true label (i.e. data elements that do not have any correct/true labels). The q+1 columns can include q columns for predicted labels. Each of the columns in the q columns can correspond to one of the potential labels/classes. The q+1 columns can also include 1 column for no predicted label (e.g. data elements for which no labels/classes were assigned by the model and data elements for which no labels/classes were assigned to some of the true labels where there is no incorrect prediction).

It should be understood that the discussion of rows and columns of the confusion matrix are for ease of reference, and that the definition of the q+1 columns and q+1 rows can be interchanged. That is, it should be understood that the q+1 rows including q rows for true labels and 1 row for no true label and the q+1 columns including q columns for predicted labels and 1 column for no predicted label are equivalent to, and interchangeable with, the q+1 columns including q columns for true labels and 1 column for no true label and the q+1 rows including q rows for predicted labels and 1 row for no predicted label.

The multi-label confusion matrix is defined to account for the occurrence of no-label-assigned or no-label-predicted for data elements in the classification task. For multi-label classifiers, the output nodes (e.g., from the last layer of a Neural Network model) with probabilities higher than a predefined threshold (e.g., 0.50) can be identified as the predicted labels. In some cases, the output nodes corresponding to true labels may be smaller than the predefined probability threshold and therefore those true labels would not be predicted—i.e. the data element would not be assigned the corresponding label by the model (e.g., class $C_1$ of element 2 in Table 1). While this does not result in an incorrect prediction, the number of predicted labels is less than the number of true labels (e.g., could be no label predicted at all). This can be summarized according to Definition 1:

Definition 1: For element i of a data set, NPL (No Predicted Label) represents a combination of true labels associated with that element (from the true labelled dataset) and predicted labels associated with that element (from the model labelled dataset) where one or more true labels are not predicted (i.e. the corresponding predicted label was not assigned) while there is no incorrect prediction (i.e. all of the predicted labels assigned by the model correspond to true labels for that element). Based on the definition of $T_i$ and $P_i$, this can be represented as $T_{i2}/=\emptyset$ and $P_{i2}=\emptyset$.

It is also possible that none of the predefined classes are appropriate to be assigned to an element of a data set (i.e. the data element is not associated with any true labels). This can be summarized according to Definition 2:

Definition 2: For element i of a data set, NTL (No True Label) represents a combination of true labels associated with that element (from the true labelled dataset) and predicted labels associated with that element (from the model labelled dataset) where there is no true label assigned to element i of a data set. Based on the definition of $T_i$ and $P_i$, this can be represented as $T_i=\emptyset$.

At 240, a populated multi-label confusion matrix can be generated for the machine learning model. The populated multi-label confusion matrix can be generated by populating the entries in the multi-label confusion matrix defined at 230.

The entries in the multi-label confusion matrix can be populated based on a comparison of the model labelled dataset and the true labelled dataset. For each data element in the plurality of data elements (in the dataset), an element-specific combination of true and predicted labels can be determined by comparing the zero or more model predicted labels associated with that data element with the zero or more true labels associated with that data element. The entries in the multi-label confusion matrix can then be defined based on the element-specific combination of true and predicted labels for each and every data element in the dataset.

For example, each data element may be assigned to a label combination category from amongst a plurality of label combination categories based on its element-specific combination of true and predicted label. The entries in the multi-label confusion matrix can then be defined by, for each label combination category, applying a category specific incrementation algorithm to the element-specific combination of true and predicted labels for each data element assigned to that label combination category. An example method 300 for populating a multi-label confusion matrix will now be described with respect to FIG. 3.

Figure 3:
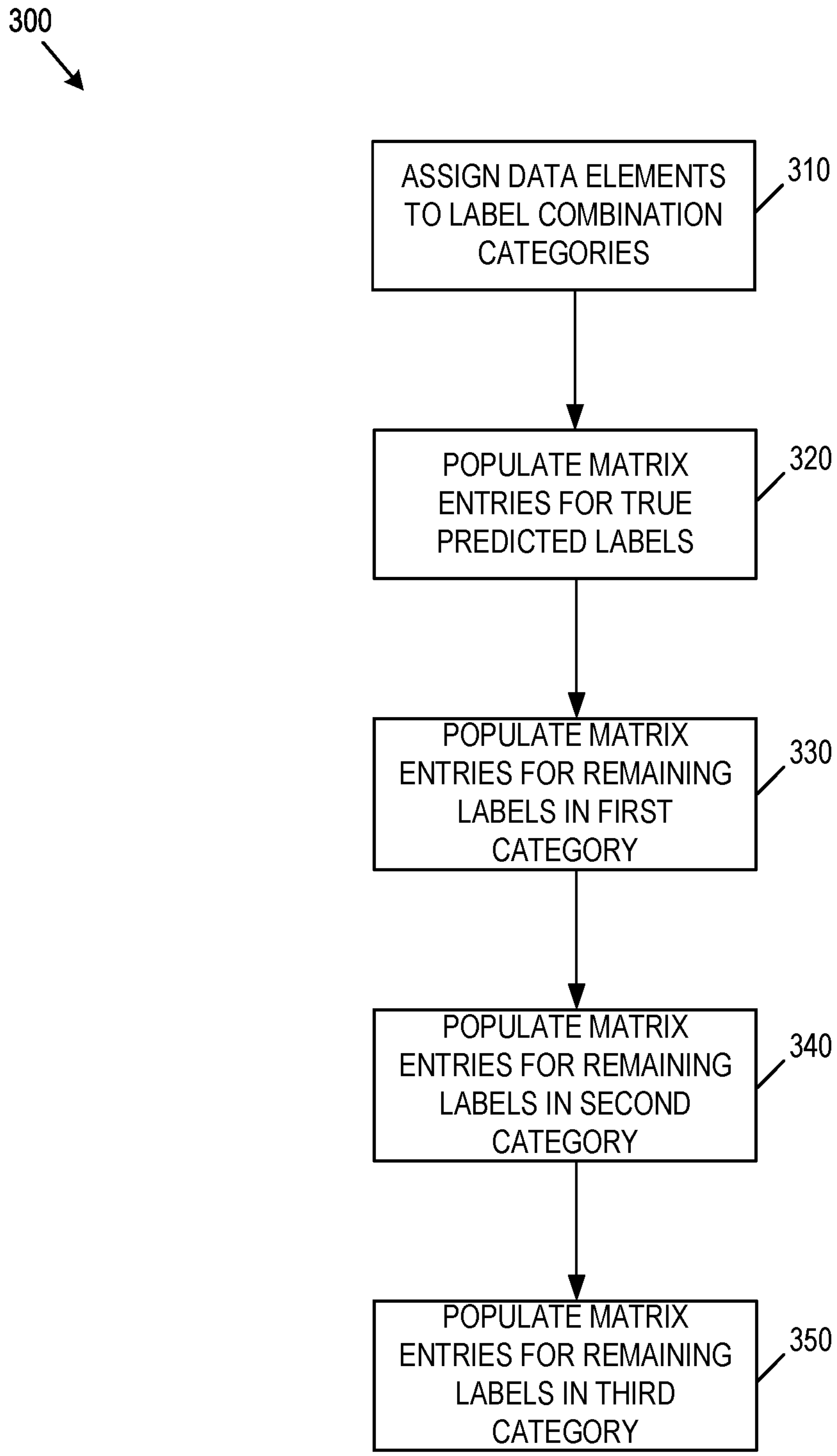
FIG. 3 is a flowchart illustrating an example process of populating a confusion matrix for a multi-label classification model that may be used with the example process shown in FIG. 2.

Referring now to FIG. 3, shown therein is an example process 300 for populating a confusion matrix for a multi-label classification model. The example process 300 can be used as part of a process for evaluating a machine learning model, such as the example process 200 described herein above. The example process 300 shown in FIG. 3 is a process for populating a confusion matrix in which data elements are assigned to label combination categories and the confusion matrix is populated using different algorithms for the labels associated with each label combination category.

At 310, the plurality of data elements in the dataset can be assigned to a plurality of label combination categories. Each data element can be assigned to a label combination category based on the element-specific combination of true and predicted labels for that data element.

For each data element, the element-specific combination of true and predicted labels can be determined by comparing the zero or more model predicted labels associated with that data element with the zero or more true labels associated with that data element. The label combination categories can be defined to handle different types of combinations of true and predicted labels that arise in the element-specific combinations of true and predicted labels.

For example, the plurality of label combination categories can be defined to include a first category, a second category, and a third category. The first category, second category, and third category can each be defined to include different types of combinations of true and predicted labels. The plurality of label combination categories can be defined collectively to capture all of the possible types of combinations of true and predicted labels.

As noted above, $T_i$ represents the set of true labels assigned to a data element i and $P_i$ represents the set of predicted labels assigned to that data element. $T_i$ can be separated into two subsets $T_{i1}$ and $T_{i2}$ for the set of predicted true labels and not-predicted true labels, respectively. Similarly, $P_i$ can be separated into two subsets $P_{i1}$ and $P_{i2}$ for the set of correctly predicted labels and incorrectly predicted labels, respectively. From this definition, it is apparent that $T_{i1}$ is equal to $P_{i1}$.

The first label combination category can be defined to include each data element for which each of the zero or more model predicted labels associated with that data element corresponds to a true label associated with that data element. In other words, at 310, each data element in the model labelled dataset for which each of the model predicted labels associated with that data element corresponds to a true label associated with that data element in the true labelled dataset can be assigned to the first category (and data elements where the model correctly predicted that no labels should be associated with that data element).

In this example, the first label combination category can include all elements for which $P_i \subseteq T_i$. The condition $P_i \subseteq T_i$ specifies that all or a subset of true labels were predicted correctly and there are no incorrect predictions (i.e., $P_{i2}=\emptyset$).

The second label combination category can be defined to include each data element for which both i) the zero or more model predicted labels associated with that data element includes each and every true label associated with that data element, and ii) the zero or more model predicted labels associated with that data element includes at least one additional predicted label that is not a true label associated with that data element. In other words, at 310 each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, can be assigned to the second category.

In this example, the second label combination category can include all elements for which $T_i \subset P_i$. The condition $T_i \subset P_i$ specifies that all true labels were predicted correctly, but there are also some incorrect predictions (i.e., $T_{i2}$=Ø and $P_{i2}$/=Ø).

The third label combination category can be defined to include each data element for which both i) the zero or more model predicted labels associated with that data element omits at least one true label associated with that data element, and ii) the zero or more model predicted labels associated with that data element includes at least one additional predicted label that is not a true label associated with that data element. In other words, at 310, each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, can be assigned to the third category.

In this example, the third label combination category can include all elements for which $T_{i2}$/=Ø and $P_{i2}$/=Ø where Ø represents an empty set. The conditions $T_{i2}$/=Ø and $P_{i2}$/=Ø specify that there are some true labels that were not predicted and there are some incorrect predictions. This can include data elements for which the set $T_{i1}$ (and equally $P_{i1}$) are empty, e.g. where none of the true labels were predicted.

The label combination categories can be used to populate the entries in the multi-label confusion matrix. Each label combination category can be associated with a corresponding category specific incrementation algorithm. The values in the multi-label confusion matrix can be defined by for each label combination category, incrementing values in the multi-label confusion matrix by applying a category specific incrementation algorithm to the element-specific combination of true and predicted labels for each data element assigned to that label combination category.

At 320, the multi-label confusion matrix can be updated based on the true predicted labels (and correctly predicted absence of true labels) associated with each of the data elements in the dataset (i.e. to reflect the true positive predictions and true negative predictions from the multi-label classifier). The values for the true predicted labels (and correctly predicted absence of true labels) can be incremented for all data elements (assigned to any and all label combination categories) in the same manner.

That is, for each correctly predicted true label in each element-specific combination of true and predicted labels, the matrix entry (or value) in the multi-label confusion matrix at the row and column location corresponding to that true label and predicted label can be incremented by 1. In addition, for each element-specific combination of true and predicted labels that contains zero true labels and zero predicted labels, the matrix entry (or value) in the populated multi-label confusion matrix at the row and column location corresponding to the no true label row and the no predicted label column can be incremented by 1. In other words, cells on the main diagonal of the multi-label confusion matrix are incremented.

The process of populating the multi-label confusion matrix based on the predicted true labels can be represented as:

$$M(r, r) = \sum_{i=1}^{m} (I(y_{i,r} = 1) I(h_r(x_i) = 1)), \forall r \in \{0, \ldots, q-1\} \tag{1}$$

where, I(•) is the indicator function, $x_i$ is the $i^{th}$ input to the classifier h(•), $y_i$ is the set of true labels assigned to input $x_i$, $y_{i,r}$ shows the occurrence of the true label r (i.e., class $C_r$) for input $x_i$ (i.e., 1 for assigning label r and 0 for not assigning label r), and $h_r(x_i)$ is the prediction for label r of input $x_i$.

Data elements where $P_i$=Ø and $T_i$=Ø cannot be accounted for using (1), as equation (1) involves identifying true positives based on a value of 1 for each label of elements while these elements would have a value of 0 for TP. Accordingly, the process of populating the multi-label confusion matrix based on the correctly predicted absence of true labels can be represented as:

$$M(NTL, NPL) = \sum_{i=1}^{m} T_i = \emptyset; P_i = \emptyset. \tag{2}$$

An example of pseudo-code that can be used to populate the multi-label confusion matrix based on the true predicted labels (and correctly predicted absence of true labels) associated with each of the data elements in the dataset is shown here:

```
for r in Th do
Mo,1)+=1
end for
if Ti = Ø and P = 0 then
M(NTL, NPL) + = 1
end if
```

The process of populating the multi-label confusion matrix for the false negative and false positive predictions from the classifier can involve applying a category specific incrementation algorithm to the data elements assigned to each label combination category, as shown in steps 330-350.

At 330, the matrix entries/values in the multi-label confusion matrix can be updated based on the remaining labels in each element-specific combination of true and predicted labels of each data element assigned to the first category. The matrix entries/values can be updated to reflect the false negative labels assigned to each data element assigned to the first category.

The matrix entries/values can be updated by for each true label in each element-specific combination of true and predicted labels where that element-specific combination of true and predicted label omits a corresponding predicted label (i.e. each false negative) incrementing the matrix entry/value in the multi-label confusion matrix at the row location corresponding to the potential label associated with that true label of the no predicted label column.

The process of populating the multi-label confusion matrix based on the false negative labels of the data elements in the first label combination category can be represented as:

$$M(r, NPL) = \sum_{i=1}^{m} (I(y_{i,r} = 1) I(h_r(x_i) = 0)), \quad \forall\, r \in \{0, \ldots, q-1\}. \tag{3}$$

That is, for each label in $T_{i2}$, the corresponding element on the NPL column of the confusion matrix is incremented. This represents a FN prediction for each label in $T_{i2}$ in the NPL column.

An example of pseudo-code that can be used to populate multi-label confusion matrix based on the false negative labels of the data elements in the first label combination category in the dataset is shown here:

```
for r in Ti do
M(rNPL)++= 1
end for
```

Referring back to the example dataset shown in Table 1, elements 1 to 3 can be seen to be in the first label combination category. For element 1 in Table 1, both true labels ($C_0$ and $C_1$) were predicted correctly (i.e., $P_i = T_i$), so the value at column $C_0$ of row $C_0$ and column $C_1$ of row $C_1$ are incremented by one to count the TP.

For element 2 in Table 1, labels $C_0$ and $C_2$ were predicted correctly, so the value at column $C_0$ of row $C_0$ and column $C_2$ of row $C_2$ are incremented by one to count the TP. Element 2 also has a further associated true label (i.e., $C_1$) but there is no more corresponding predicted label assigned to it (i.e., $T_{i2} = \{C_1\}$ and $P_{i2} = \emptyset$). This lack of a corresponding predicted label represents a FN for class $C_1$ to the no-label prediction, therefore the value at column NPL of row $C_1$ is incremented by one.

For element 3 in Table 1, none of the labels were assigned to this element and none of the labels were predicted for it (i.e., TP), thus the value of the element at column NPL of row NTL is incremented by one. For elements 1 and 3 the set $P_i$ is equal to set $T_i$, thus $T_{i2} = \emptyset$ and step 330 need not be performed for these elements.

At 340, the matrix entries/values in the multi-label confusion matrix can be updated based on the remaining labels in each element-specific combination of true and predicted labels of each data element assigned to the second category. The matrix entries/values can be updated to reflect the false positive labels assigned to each data element assigned to the second category.

The matrix entries/values can be updated for the second label combination category by for each predicted label in each element-specific combination of true and predicted labels where that element-specific combination of true and predicted label omits a corresponding true label (i.e. for each false positive where that data element has at least one associated true label), incrementing a matrix entry in the multi-label confusion matrix at every row location corresponding to any true label for the corresponding data element of the column corresponding to that predicted label. This can be represented as:

$$M(r, c) = \sum_{i=1}^{m} (I(y_{i,r} = 1) I(h_r(x_1) = 1) \times I(y_{i,c} = 0) I(h_c(x_i) = 1)), \quad \forall\, r, c \in \{0, \ldots, q-1\}. \tag{4}$$

For each label in $P_{i2}$ (i.e. for each falsely predicted class for that element), the value in the columns corresponding to labels in $P_{i2}$ for all rows corresponding to labels in $T_i$ (i.e. for all true labels assigned to that element) can be incremented. Accordingly, although all true labels were predicted correctly, the incorrect predictions will be counted as FN to all of correctly predicted labels since no unpredicted true label exists to be considered for incorrect prediction(s) (i.e., $T_{i2} = \emptyset$). The incremented value of FN in the confusion matrix is considered as FP for all classes in $P_{i2}$. However, data elements with no true labels but at least one incorrect predicted label (i.e. where $T_i = \emptyset$ while $P_i$/=$\emptyset$) are accounted for separately.

To account for data elements with no true labels but at least one incorrect predicted label, the matrix entries/values can additionally be updated for the second label combination category by for each predicted label in each element-specific combination of true and predicted labels that omits any and all true labels, incrementing a matrix entry in the multi-label confusion matrix at the no true label row of the column corresponding to that predicted label. This can be represented as:

$$M(NTL, c) = \sum_{i=1}^{m} I(h_c(x_i) = 1), \ \forall\, c \in \{0, \ldots, q-1\};\ T_i \neq \phi;\ P_i \neq \phi. \tag{5}$$

An example of pseudo-code that can be used to populate multi-label confusion matrix based on the false positive labels of the data elements in the second label combination category in the dataset is shown here:

```
for r in Ti do
  for c in Pi2 do
    M(r, c) + = 1
  end for
end for
if Ti = Ø then
  for c in Pi2 do
    M(NTL,c) + = 1
  end for
end if
```

Referring again to the dataset shown in Table 1, elements 4, 5, and 6 are assigned to the second label combination category. For element 4, two labels (i.e. $C_1$ and $C_2$) were predicted incorrectly in addition to the correctly predicted true label $C_0$. For element 4, there is one TP to class $C_0$ and the value at column $C_0$ of row $C_0$ will be increased at 320. In addition, row $C_0$ will be increased for all additional incorrect predicted labels (i.e., the value at columns $C_1$ and $C_2$ of row $C_0$). This update to the confusion matrix reflects that although the classifier predicted the true label for this element (one TP), it also predicted two additional labels for this element that should be considered as FN for each false prediction.

For element 5 in Table 1, two labels were assigned to the element as the true labels (i.e., $C_0$ and $C_1$) and both were predicted correctly, but there is one extra predicted label (i.e., $C_2$) that was predicted incorrectly (FN). In this case, the update to the MLCM will be one TP to each of classes $C_0$ and $C_1$ (at 320). In addition, the value at column $C_2$ will be incremented for both $C_0$ and $C_1$ rows to reflect the possibility of FN to both true labels. This will count the FN for each true label.

For element 6 in Table 1, there is no true label assigned but labels $C_1$ and $C_2$ were incorrectly predicted. Accordingly, the value at columns $C_1$ and $C_2$ of the last row (i.e., NTL) are incremented to show the FN of no-class to classes $C_1$ and $C_2$. This incremented value of FN in the confusion matrix is also considered as FP to classes $C_1$ and $C_2$.

At 350, the matrix entries/values in the multi-label confusion matrix can be updated based on the remaining labels in each element-specific combination of true and predicted labels of each data element assigned to the third category. The matrix entries/values can be updated to reflect the false positive labels assigned to each data element assigned to the second category.

The matrix entries/values can be updated by for each predicted label in each element-specific combination of true and predicted labels where that element-specific combination of true and predicted label omits a corresponding true label, incrementing a matrix entry in the multi-label confusion matrix at every row location corresponding to one of the true labels in the at least one true label associated with that data element for which the element-specific combination of true and predicted label omits a corresponding predicted label of the column corresponding to that predicted label. This can be represented as:

$$M(r, c) = \sum_{i=1}^{m} (I(y_{i,r} = 1)I(h_r(x_i) = 0) \times I(y_{i,c} = 0)I(h_c(x_i) = 1)), \quad \forall\, r, c \in \{0, \ldots, q-1\}. \tag{6}$$

For each label in $P_{i2}$ (i.e. each falsely predicted class assigned to a data element) the corresponding value at columns related to labels in $P_{i2}$ for all rows corresponding to labels in $T_{i2}$ is increased. Accordingly, the incorrectly predicted labels will be counted as FN to all of the not-predicted labels (i.e., classes in $T_{i2}$). This update also represents FP to classes in $P_{i2}$.

An example of pseudo-code that can be used to populate multi-label confusion matrix based on the false positive labels of the data elements in the third label combination category in the dataset is shown here:

```
for r in T_i2 do
  for c in P_i2 do
    M(r,c)+ = 1
  end for
end for
```

Referring yet again to the example dataset shown in Table 1, elements 7, 8 and 9 are in category three. For element 7, the true label is $C_0$ but labels $C_1$ and $C_2$ were predicted incorrectly (i.e., $T_{i1}=\emptyset$ and $T_{i2}=T_i$). The multi-label confusion matrix can thus be updated at 350 by two FN for $C_0$, one each for classes $C_1$ and $C_2$. This also represents a FP for $C_1$ and $C_2$ (i.e., by incrementing the value at columns $C_1$ and $C_2$ of row $C_0$).

For the elements 8 and 9 two labels assigned to each of the elements as the true labels (i.e., $C_0$ and $C_1$). For elements 8, one of the labels ($C_0$) was predicted correctly (i.e., set $T_{i1}$), so the value of element at column $C_0$ of row $C_0$ is incremented as the TP (at 320). At 350, the value at column $C_2$ of row $C_1$ is incremented (i.e., FN of class $C_1$, also FP to class $C_2$).

For element 9 none of the true labels were predicted correctly (i.e., $T_{i1}=\emptyset$ and $T_{i2}=T_i$) and label $C_2$ was predicted incorrectly. Thus, the values at column $C_2$ of rows $C_0$ and $C_1$ are incremented at 350.

Referring yet again to the example dataset shown in Table 1, following steps 310-350 a multi-label confusion matrix can be populated for that dataset as described herein above. As noted above, the multi-label confusion matrix can be defined (at 230) to include one row and one column for each predefined class and an additional row (i.e., last row NTL) for elements where none of the true labels were assigned and an additional column (i.e., last column NPL) for elements where there is no prediction for some (or all) of the true labels.

Accordingly, for a classification task with q classes, MLCM has q+1 rows and q+1 columns in total. Rows and columns from 0 to q−1 can be used for classes $C_0$ to $C_{q-1}$, where the row q and the column q can be used for the no label assigned and no label predicted situations, respectively.

Tables 2a-2i shows the results of applying process 300 to each of the elements in Table 1 while table 2j shows the final populated MLCM. The rows represent the true labels for classes $C_0$, $C_1$, $C_2$, and no true label and the columns represent the predicted labels for $C_0$, $C_1$, $C_2$, and no predicted label. As can be seen in Table 2, the final populated MLCM can be defined by combining the individual MLCMs determined for each of the elements:

TABLE 2

MLCM for the Example Dataset Shown in Table 1

| | | | |
|---|---|---|---|
| (a) instance 1 | | | |
| 1 | 0 | 0 | 0 |
| 0 | 1 | 0 | 0 |
| 0 | 0 | 0 | 0 |
| 0 | 0 | 0 | 0 |
| (b) instance 2 | | | |
| 1 | 0 | 0 | 0 |
| 0 | 0 | 0 | 1 |
| 0 | 0 | 1 | 0 |
| 0 | 0 | 0 | 0 |
| (c) instance 3 | | | |
| 0 | 0 | 0 | 0 |
| 0 | 0 | 0 | 0 |
| 0 | 0 | 0 | 0 |
| 0 | 0 | 0 | 1 |
| (d) instance 4 | | | |
| 1 | 1 | 1 | 0 |
| 0 | 0 | 0 | 0 |
| 0 | 0 | 0 | 0 |
| 0 | 0 | 0 | 0 |
| (e) instance 5 | | | |
| 1 | 0 | 1 | 0 |
| 0 | 1 | 1 | 0 |
| 0 | 0 | 0 | 0 |
| 0 | 0 | 0 | 0 |
| (f) instance 6 | | | |
| 0 | 0 | 0 | 0 |
| 0 | 0 | 0 | 0 |
| 0 | 0 | 0 | 0 |
| 0 | 1 | 1 | 0 |

TABLE 2-continued

MLCM for the Example Dataset Shown in Table 1

| | | | |
|---|---|---|---|
| (g) instance 7 | | | |
| 0 | 1 | 1 | 0 |
| 0 | 0 | 0 | 0 |
| 0 | 0 | 0 | 0 |
| 0 | 0 | 0 | 0 |
| (h) instance 8 | | | |
| 1 | 0 | 0 | 0 |
| 0 | 0 | 1 | 0 |
| 0 | 0 | 0 | 0 |
| 0 | 0 | 0 | 0 |
| (i) instance 9 | | | |
| 0 | 0 | 1 | 0 |
| 0 | 0 | 1 | 0 |
| 0 | 0 | 0 | 0 |
| 0 | 0 | 0 | 0 |
| (j) total MLCM | | | |
| 5 | 2 | 4 | 0 |
| 0 | 2 | 3 | 1 |
| 0 | 0 | 1 | 0 |
| 0 | 1 | 1 | 1 |

Table 3 shows an example of a data element that can be assigned to 5 potential classes for which the size of sets $T_{i2}$ and $P_{i2}$ are both greater than one:

TABLE 3

True vs. Predicted Labels for Example Data Element with Five Potential Classes

| | Classes | | | | |
|---|---|---|---|---|---|
| sample instance | $C_0$ | $C_1$ | $C_2$ | $C_3$ | $C_4$ |
| True Label | 1 | 1 | 1 | 0 | 0 |
| Predicted Label | 1 | 0 | 0 | 1 | 1 |

As can be seen from Table 3, the set of true labels $T_i=\{C_0, C_1, C_2\}$, the set of predicted labels $P_i=\{C_0, C_3, C_4\}$, the set of correctly predicted true labels $T_{i1}=\{C_0\}$, the set of non-predicted true labels $T_{i2}=\{C_1, C_2\}$, the set of correct predicted labels $P_{i1}=\{C_0\}$, and the set of incorrect predicted true labels $P_{i2}=\{C_3, C_4\}$. Accordingly, the multi-label confusion matrix for this element will be incremented (at 320) to include one TP for class $C_0$ (i.e., by increasing the value at column $C_0$ of row $C_0$) and to include a FN for each of classes $C_1$ and $C_2$ to classes $C_3$ and $C_4$ (i.e., increase the value at columns $C_3$ and $C_4$ of rows $C_1$ and $C_2$).

Referring again to FIG. 2, at 250 at least one performance metric can be calculated for the machine learning model from the populated multi-label confusion matrix (from 240). Various different types of performance metrics can be used to assess the performance of the machine learning model.

In some examples, a performance metric may be defined for an individual class. For example, the true positive (TP) metric, true negative (TN) metric, false positive (FP) metric, and false negative (FN) metric can each be determined for the individual classes applied to the dataset. These individual class values can be extracted individually from the populated multi-label confusion matrix for each of the classes applied to the dataset.

Generally speaking, for row k ($k \in \{0, \ldots, q\}$) which corresponds to class $C_k$ (or NTL for k=q), the cell/matrix entry on the main diagonal of the multi-label confusion matrix represents the TP to class $C_k$, while other cells on the row k show the FN to class $C_k$. Except for the cell on the main diagonal, the cells on column k show the FP to class $C_k$. The summation of cells on row k, excluding the cell on the main diagonal, and the summation of cells on column k, excluding the cell on the main diagonal, represent the overall FN and FP to class $C_k$, respectively.

Equations (7) to (10) can be used to calculate TP, TN, FP, and FN, respectively, for class $C_k$:

$$TP_k = M(k, k), \forall k \in \{0, \ldots, q\} \tag{7}$$

$$TN_k = \sum_{j=0}^{q}(M(j, j)) - M(k, k), \forall k \in \{0, \ldots, q\} \tag{8}$$

$$FP_k = \sum_{j=0}^{q}(M(j, k)) - M(k, k), \forall k \in \{0, \ldots, q\} \tag{9}$$

$$FN_k = \sum_{j=0}^{q}(M(k, j)) - M(k, k), \forall k \in \{0, \ldots, q\} \tag{10}$$

where M is the MLCM, and q is the number of predefined classes.

Table 4 illustrates an example of how TP, TN, FP, and FN can be extracted for class $C_2$ of a set of five potential classes ($C_0$-$C_4$) (similar to that shown in Table 3) from the corresponding multi-label confusion matrix:

TABLE 4

Extracting TP, TN, FP, and FN metrics from MLCM for class $C_2$

| | | Predicted Labels | | | | | |
|---|---|---|---|---|---|---|---|
| | Classes | $C_0$ | $C_1$ | $C_2$ | $C_3$ | $C_4$ | NPL |
| True Labels | $C_0$ | $TN_{2,0}$ | | $FP_{0,2}$ | | | |
| | $C_1$ | | $TN_{2,1}$ | $FP_{1,2}$ | | | |
| | $C_2$ | $FN_{2,0}$ | $FN_{2,1}$ | $TP_2$ | $FN_{2,3}$ | $FN_{2,4}$ | $FN_{2,NPL}$ |
| | $C_3$ | | | $FP_{3,2}$ | $TN_{2,3}$ | | |
| | $C_4$ | | | $FP_{4,2}$ | | $TN_{2,4}$ | |
| | NTL | | | $FP_{NTL,2}$ | | | $TN_{2,NTL}$ |

In addition to the TP, TN, FP, and FN of each class that can be extracted from the MLCM, other performance metrics such as precision, recall, and $F^{\beta}$score can be calculated for each of the classes using equations (11) to (13), respectively.

$$\text{precision}_c = \frac{TP_c}{TP_c + FP_c} \tag{11}$$

$$\text{recall}_c = \frac{TP_c}{TP_c + FN_c} \tag{12}$$

$$F^{\beta}\text{score}_c = \frac{(\beta^2 + 1)TP_c}{(\beta^2 + 1)TP_c + \beta^2 FN_c + FP_c} \tag{13}$$

where $TP_c$, $FP_c$, and $FN_c$ are the number of TP, FP, and FN predictions of the classifier for class C, respectively. In measuring $F^{\beta}$score, β is the balancing factor with positive amount which commonly is set to 1 (e.g., F1-score), resulting in the harmonic mean of precision and recall.

In addition, micro, macro, and weighted averages of precision, recall, and Fβscore can be calculated using extracted TP, TN, FP, and FN. Equations (14) to (16) show example equations for calculating the micro, macro, and weighted average metrics for $F^{\beta}$score:

$$F^{\beta}_{micro}\text{score} = \frac{(\beta^2+1)\sum_{c=0}^{q-1} TP_c}{(\beta^2+1)\sum_{c=0}^{q-1} TP_c + \beta^2\sum_{c=0}^{q-1} FN_c + \sum_{c=0}^{q-1} FP_c} \quad (14)$$

$$F^{\beta}_{macro}\text{score} = \frac{1}{q}\sum_{c=0}^{q-1} F^{\beta}_c \quad (15)$$

$$F^{\beta}_{weighted}\text{score} = \frac{\sum_{c=0}^{q-1} F^{\beta}_c S_c}{\sum_{c=0}^{q-1} S_c} \quad (16)$$

where q is the number of classes, $F^{\beta}$ is the $F^{\beta}$score of class C calculated from (13), and $S_c$ is the number of the elements that have been labeled as class C. Equations for calculating micro, macro, and weighted average of precision and recall are similar to equations (14) to (16), respectively.

Various other types of performance metrics can also be calculated using one or more of the extracted TP, TN, FP, and FN metrics, such as specificity for example.

Other performance metrics that do not require data extracted from the MLCM, such as hamming loss, may also be calculated for the classifier. Hamming loss is the symmetric difference between the set of true labels and the set of predicted labels which may be calculated by applying the exclusive disjunction function for each element and then adding them together to find the overall measurement as illustrated in (17):

$$hammingloss = \frac{1}{m}\sum_{i=1}^{m}\frac{1}{q}\Delta(T_i, P_i) \quad (17)$$

where m is the number of elements, $T_i$ and $P_i$ are the list of true and predicted labels for element i, respectively, q is the number of predefined classes, and Δ is the exclusive disjunction function.

At 260, the at least one performance metric from 250 can be output. For example, the at least one performance metric can be output through an output device (e.g. shown on a display or transmitted to a user device) to provide a user with feedback on the performance of the classifier. Alternatively or in addition, the at least one performance metric may be stored, e.g. for later review, comparison, analysis, or monitoring.

Optionally, a model improvement recommendation may be generated based on the at least one performance metric. The at least one model improvement recommendation can be output through an output device to provide a user with guidance regarding how to improve the performance of the classifier.

For example, at least one particular class of the q potential classes for which the machine learning model is underperforming relative to the other potential classes can be identified from the performance metrics determined at 250. The underperforming class can be identified for a user to enable the user to modify the classifier to improve performance for that particular class.

Optionally, a second model labelled dataset can be received from a second multi-label classification machine learning model. The second model labelled dataset can include the same plurality of data elements and a second plurality of model predicted labels. Process 200 (and 300) may then be performed for the second multi-label classifier to allow the performance of the classifiers to be compared.

That is, a second multi-label confusion matrix can be defined for the second multi-label classification machine learning model (e.g. as described at 230). A second populated multi-label confusion matrix can be generated for the second multi-label classification machine learning model (e.g. as described at 240 and in process 300). The at least one performance metric can be calculated for the second multi-label classification machine learning model from the second populated multi-label confusion matrix (e.g. as described at 250).

The at least one performance metric for the second multi-label classification machine learning model can then be compared with the at least one performance metric for the initial machine learning model. A preferred model can be identified based on comparing the at least one performance metric for the second multi-label classification machine learning model and the at least one performance metric for the machine learning model. The preferred model can then be provided to the user in the at least one model improvement recommendation. This may allow the user to select from amongst multiple potential models for actual implementation in a given classification task.

Experimental Results

A commonly used method in the Python programming language library (i.e. scikit-learn) (see F. Pedregosa, G. Varoquaux, A. Gramfort, V. Michel, and B. Thirion, "Scikit-learn: Machine learning in Python," J. Mach. Learn. Res., vol. 12 no. 10, pp. 2825 2830, 2012) for calculating FN only determines if a true label is not predicted correctly and, similarly, for calculating FP only determines if a non-assigned label is predicted incorrectly, without reporting how many incorrect predictions occurred and how many true labels were not predicted for the associated element. For example, for a multi-label data set with three classes such as the example dataset shown in Table 1, for all elements (except for elements 1 and 8), the calculated FN and FP by the scikit-learn method are ambiguous. In particular, the scikit-learn method is problematic for element 2 which was labeled with all three classes, and the classifier was unable to predict label $C_1$ while there is no incorrect prediction to be FN of class $C_1$. Similarly, element 5 was labeled with classes $C_0$ and $C_1$ which were predicted and are counted as true positive (TP), but label $C_2$ was also predicted where none of the true labels is missing to be assigned for this incorrect prediction using the scikit-learn methods.

The scikit-learn methods report the results using one-vs-rest confusion matrices which is calculated based on FN, FP, TP, and true negative (TN) of one class versus all other classes. For elements in Table 1, three one-vs-rest confusion matrices are created. Tables 5a, 5b, and 5c show the resulting one-vs-rest confusion matrices for classes $C_0$, $C_1$, and $C_2$, respectively (using the scikit-learn Python library (sklearn)). The first and second rows show [TN, FP] and [FN, TP], respectively. Table 5d shows the element wise summation of these three matrices which is used for calculating micro average of precision, recall, and F-score.

TABLE 5

One-vs-rest confusion matrix for sample instances in Table 1 using sklearn library

| (a) Co | | (b) Ci | | (c) C2 | | (d) Sum | |
|---|---|---|---|---|---|---|---|
| 2 | 0 | 1 | 3 | 2 | 6 | 5 | 9 |
| 2 | 5 | 3 | 2 | 0 | 1 | 5 | 8 |

In Table 5d, the summation of FN (e.g., 5) is not equal to the summation of FP (e.g., 9) for all classes. For example, if the true label is $C_1$ and the predicted label is $C_2$, there is one FN for class $C_1$ which is one FP to class $C_2$. This simple example illustrates that the scikit-learn method for identifying FP and FN is incomplete by only focusing on one class at a time and ignoring the combination of the true and predicted labels for other classes.

As noted above, the MLCM described herein has q+1 rows and q+1 columns to represent data elements with NTL and NPL and ensure that all combinations of true and predicted labels can be represented. As the multi-label classification task allows for more than one true label and more than one predicted label, the methods described herein allow for incorrect predictions to be reflected over several classes. As a result, the summation of values in each row of the MLCM may be greater than the number of elements that belong to the corresponding class. Consequently, the summation of all cells is greater than the total number of elements because each element may have more than one true label.

For the MLCM, the main diagonal of the row-wise normalized matrix shows the recall values, where the main diagonal of the column-wise normalized matrix shows the precision values. Table 6 shows four one-vs-rest confusion matrices extracted from the multi-label confusion matrix for the example dataset shown in Table 1. The first and second rows show [TN, FP] and [FN, TP], respectively.

TABLE 6

One-vs-rest confusion matrix for sample elements in Table 1 using MLCM

| (a) Co | | (b) C: | | (c) C | | (d) NTL | | (e) Sum | |
|---|---|---|---|---|---|---|---|---|---|
| 4 | 0 | 7 | 3 | 8 | 8 | | | 27 | 12 |
| 6 | 5 | 4 | 2 | 0 | 1 | 2 | | | 9 |

As can be seen from Table 6, the summation of FN to all classes is equal to the summation of FP to all classes (e.g., see Table 6 in comparison to Table 5). Furthermore, the total TP in Table 6 is equal to 9, where the total TP in Table 5 is equal to 8 because it misses element 3 in the dataset of Table 1 as a TP. As discussed herein above, other methods for calculating FN and FP for multi-label classifiers and consequently calculating metrics such as precision, recall, and F-score result in an incomplete and potentially skewed view of classifier performance.

A property of a multi-class confusion matrix is that each cell on the main diagonal is counted once as a TP and counted q−1 times as the TN to other classes. Accordingly, the summation of all TN will be q−1 times of summation of all TP.

Similarly, for the MLCM, the summation of all TN is q times of summation of all TP, as there is one extra row and column (i.e., NTL and NPL) to MLCM. This provides further evidence that the existing methods (e.g., sklearn) are incomplete as shown by the comparison of Table 5 and Table 6 discussed above. Similar to the multi-class confusion matrix, the summation of each row of MLCM can be used to calculate the weighted average of metrics such as precision, recall, or F-score as described above at 260. The metrics such as precision, recall, and F-score calculated based on TP, TN, FP, and FN from MLCM will remain between zero (i.e., TP=0) and one (i.e., FP=0 for precision; FN=0 for recall; FP=0 and FN=0 for F-score).

From the above comparison, it can be seen that MLCM maintains the same properties of a multi-class confusion matrix has.

Use of the MLCM was tested with the classification of two publicly available multi-label data sets: i) a 12-lead ECG data set with nine classes, and ii) a movie poster data set with eighteen classes. A comparison of the MLCM results against statistics from the sklearn methods is presented to show the effectiveness in providing a concise and unambiguous understanding of a multi-label classifier behavior.

The methods described herein were used with the classification of a real medical waveform data set that was composed of 12-lead ECG measurement of heart signals with nine classes (from E. A. Perez Alday, A. Gu, A. J Shah, C. Robichaux, A.-K. Ian Wong, C. Liu, F. Liu, A. Bahrami Rad, A. Elola, S. Seyedi, Q. Li, A. Sharma, G. D. Clifford, and M. A. Reyna, "Classification of 12-lead ECGs: The PhysioNet/Computing in cardiology challenge 2020," *Physiolog. Meas.*, vol. 41, no. 12, December 2020, Art. no. 124003). Each signal was assigned with up to three labels. Almost 7% of signals were assigned to more than one class. The following performance measurements were calculated based on the results of applying a multi-label deep convolution neural network (Deep CNN) on this ECG data set.

Table 7 illustrates the (a) raw and (b) normalized MLCM

| | Classes | $C_0$ | $C_1$ | $C_2$ | $C_3$ | $C_4$ | $C_5$ | $C_6$ | $C_7$ | $C_8$ | NPL |
|---|---|---|---|---|---|---|---|---|---|---|---|
| | (a) Raw MLCM | | | | | | | | | | |
| True | $C_0$ | 58 | 1 | 0 | 1 | 0 | 5 | 4 | 2 | 3 | 7 |
| Labels | $C_1$ | 1 | 105 | 0 | 0 | 1 | 1 | 0 | 0 | 4 | 13 |
| | $C_2$ | 0 | 2 | 24 | 0 | 0 | 0 | 0 | 0 | 0 | 3 |
| | $C_3$ | 1 | 1 | 1 | 9 | 0 | 4 | 1 | 0 | 0 | 4 |
| | $C_4$ | 2 | 5 | 2 | 1 | 54 | 2 | 1 | 0 | 0 | 7 |
| | $C_5$ | 5 | 3 | 1 | 0 | 1 | 10 | 4 | 2 | 5 | 20 |
| | $C_6$ | 1 | 0 | 0 | 5 | 4 | 9 | 48 | 6 | 2 | 24 |
| | $C_7$ | 3 | 1 | 1 | 0 | 1 | 9 | 1 | 42 | 3 | 18 |
| | $C_8$ | 4 | 5 | 0 | 0 | 4 | 8 | 2 | 0 | 161 | 11 |
| | NTL | 0 | 0 | 0 | 0 | 0 | 0 | 0 | 0 | 0 | 0 |
| | (b) Normalized MLCM | | | | | | | | | | |
| | $C_0$ | 72 | 1 | 0 | 1 | 0 | 6 | 5 | 2 | 4 | 9 |
| | $C_1$ | 1 | 84 | 0 | 0 | 1 | 1 | 0 | 0 | 3 | 10 |
| | $C_2$ | 0 | 7 | 83 | 0 | 0 | 0 | 0 | 0 | 0 | 10 |
| | $C_3$ | 5 | 5 | 5 | 43 | 0 | 19 | 5 | 0 | 0 | 19 |
| | $C_4$ | 3 | 7 | 3 | 1 | 73 | 3 | 1 | 0 | 0 | 9 |
| | $C_5$ | 10 | 6 | 2 | 0 | 2 | 20 | 8 | 4 | 10 | 39 |
| | $C_6$ | 1 | 0 | 0 | 5 | 4 | 9 | 48 | 6 | 2 | 24 |
| | $C_7$ | 4 | 1 | 1 | 0 | 1 | 11 | 1 | 53 | 4 | 23 |
| | $C_8$ | 2 | 3 | 0 | 0 | 2 | 4 | 1 | 0 | 83 | 6 |
| | NTL | 0 | 0 | 0 | 0 | 0 | 0 | 0 | 0 | 0 | 0 |

Table 8 shows ten one-vs-rest confusion matrices from MLCM

| (a) $C_0$ | | (b) $C_1$ | | (c) $C_2$ | | (d) $C_3$ | | (e) $C_4$ | | (f) $C_5$ | | (g) $C_6$ | | (h) $C_7$ | | (i) $C_8$ | | (j) NPL | |
|---|---|---|---|---|---|---|---|---|---|---|---|---|---|---|---|---|---|---|---|
| 453 | 17 | 406 | 18 | 487 | 5 | 502 | 7 | 457 | 11 | 501 | 38 | 463 | 13 | 469 | 10 | 350 | 17 | 511 | 107 |
| 23 | 58 | 20 | 105 | 5 | 24 | 12 | 9 | 20 | 54 | 41 | 10 | 51 | 48 | 37 | 42 | 34 | 161 | 0 | 0 |

To compare the proposed MLCM to the current overall performance measurements, the sklearn library (see F. Pedregosa, G. Varoquaux, A. Gramfort, V. Michel, and B. Thirion, "Scikit-learn: Machine learning in Python," *J. Mach. Learn. Res.*, vol. 12 no. 10, pp. 2825 2830, 2012) was used to measure performance using multilabel_confusion_matrix and classification_report functions in Table 9 and Table 10, respectively.

Table 9 shows nine binary confusion matrices, representing a one-vs-rest confusion matrix for each of the nine classes.

TABLE 9

One-vs-rest confusion matrix for ECG data set using sklearn library.

| (a) $C_0$ | | (b) $C_1$ | | (c) $C_2$ | | (d) $C_3$ | | (e) $C_4$ | | (f) $C_5$ | | (g) $C_6$ | | (h) $C_7$ | | (i) $C_8$ | |
|---|---|---|---|---|---|---|---|---|---|---|---|---|---|---|---|---|---|
| 594 | 17 | 550 | 17 | 656 | 5 | 663 | 7 | 605 | 11 | 600 | 38 | 577 | 13 | 600 | 10 | 494 | 17 |
| 20 | 58 | 17 | 105 | 4 | 24 | 10 | 9 | 19 | 54 | 41 | 10 | 51 | 48 | 37 | 42 | 17 | 161 |

Table 10 shows precision, recall, and F1-score based on the results presented in Table 9.

TABLE 10 scikit overall performance

| Class | precision | recall | F1-score | support |
|---|---|---|---|---|
| 0 | 0.77 | 0.74 | 0.76 | 78 |
| 1 | 0.86 | 0.86 | 0.86 | 122 |
| 2 | 0.83 | 0.86 | 0.84 | 28 |
| 3 | 0.56 | 0.47 | 0.51 | 19 |
| 4 | 0.83 | 0.74 | 0.78 | 73 |
| 5 | 0.21 | 0.20 | 0.20 | 51 |
| 6 | 0.79 | 0.48 | 0.60 | 99 |
| 7 | 0.81 | 0.53 | 0.64 | 79 |
| 8 | 0.90 | 0.90 | 0.90 | 178 |
| micro avg | 0.79 | 0.70 | 0.74 | 727 |
| macro avg | 0.73 | 0.64 | 0.68 | 727 |
| weighted avg | 0.79 | 0.70 | 0.74 | 727 |

Table 11 illustrates the MLCM calculated precision, recall, and F1-score based on the results shown in Table 8:

TABLE 11

MLCM overall performance

| Class | precision | recall | F1-score | weight |
|---|---|---|---|---|
| 0 | 0.77 | 0.72 | 0.74 | 81 |
| 1 | 0.85 | 0.84 | 0.85 | 125 |
| 2 | 0.83 | 0.83 | 0.83 | 29 |
| 3 | 0.56 | 0.43 | 0.49 | 21 |
| 4 | 0.83 | 0.73 | 0.78 | 74 |
| 5 | 0.21 | 0.20 | 0.20 | 51 |
| 6 | 0.79 | 0.48 | 0.60 | 99 |
| 7 | 0.81 | 0.53 | 0.64 | 79 |
| 8 | 0.90 | 0.83 | 0.86 | 195 |
| micro avg | 0.68 | 0.68 | 0.68 | 754 |
| macro avg | 0.73 | 0.62 | 0.67 | 754 |
| weighted avg | 0.79 | 0.68 | 0.72 | 754 |

In addition, a dataset of movie posters with eighteen classes where each poster may be assigned up to ten labels. Most of the posters were assigned to more than one class. Table 12 shows the selected rows of the normalized MLCM determined from the results of applying a trained deep CNN classifier (see A. Maiza. (October 2020). *Multi-Label Image Classification in Tensor-flow* 2.0. [Online]. Available: https://towardsdatascience.com/multi-label-image-classification-in-tens % or ow-2-0-7d4cf8a4bc72) on the posters validation set, where the micro-average F1-score of the classifier is 0.33.

TABLE 12

Selected rows of normalized MLCM for movie posters classification

| | | Predicted Labels | | | | | | | | | | | | | | | | | | |
|---|---|---|---|---|---|---|---|---|---|---|---|---|---|---|---|---|---|---|---|---|
| | Classes | $C_0$ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | NPL |
| True Labels | $C_0$ | 6 | 1 | 1 | 1 | 15 | 3 | 4 | 39 | 1 | 2 | 0 | 3 | 0 | 1 | 8 | 1 | 5 | 0 | 7 |
| | $C_4$ | 4 | 3 | 1 | 1 | 19 | 4 | 3 | 34 | 2 | 2 | 1 | 3 | 0 | 2 | 6 | 2 | 7 | 0 | 7 |
| | $C_7$ | 1 | 2 | 1 | 0 | 7 | 2 | 1 | 66 | 1 | 2 | 0 | 2 | 0 | 1 | 5 | 1 | 5 | 0 | 0 |

TABLE 12-continued

| Selected rows of normalized MLCM for movie posters classification | | | | | | | | | | | | | | | | | | | |
|---|---|---|---|---|---|---|---|---|---|---|---|---|---|---|---|---|---|---|---|
| | Predicted Labels | | | | | | | | | | | | | | | | | | |
| Classes | $C_0$ | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | NPL |
| $C_{14}$ | 6 | 5 | 1 | 1 | 10 | 7 | 4 | 22 | 1 | 3 | 0 | 4 | 0 | 2 | 8 | 2 | 8 | 0 | 17 |
| $C_{16}$ | 3 | 3 | 1 | 1 | 18 | 3 | 3 | 34 | 1 | 2 | 0 | 3 | 0 | 1 | 8 | 1 | 8 | 0 | 8 |
| NTL | 3 | 1 | 1 | 1 | 18 | 2 | 3 | 50 | 1 | 1 | 0 | 3 | 0 | 1 | 8 | 2 | 4 | 0 | 0 |

A high threshold equal to 0.90 over the output of Sigmoid function was used to increase the performance of the classifier (e.g., F1-score was 0.31 for the threshold equal to 0.50). As a result, larger values can be seen in the NPL column. From the NTL row of this MLCM, it can be observed that some movies were unlabeled with any predefined genres, which was reflected by the methods described herein.

The MLCM described herein enables a 2D confusion matrix to be generated for multi-label classifiers. Reviewing Table 10 (i.e., current measurement tools), it can be seen that class 3 (shown as $C_3$ in Table 7) has a low F1-score (0.51). The precision and recall for this class are 0.56 and 0.47, respectively, indicating similar FP and FN for this class. Knowing the overall F1-score only shows how the classifier performs on this specific class, whereas the precision and recall illustrate the overall FP and the overall FN related to this class, respectively. Using this report, the distribution of FN over other classes and the FP portion related to other classes cannot be found. By contrast, using the methods described herein, (e.g. from row $C_3$ of Table 7a or 7b), it can be easily determined that the classifier has the most confusion with class $C_5$ and with the no-label (NPL) prediction.

Returning to Table 10, it is apparent that class 8 has a high F1-score (0.90). The precision and recall for this class are 0.90 and 0.90, respectively, which shows low FP and FN for this class. Using this report, the distribution of FN over other classes and the FP portion of other classes to this class cannot be determined. By contrast, using the methods described herein, (e.g. from row $C_8$ of Table 7a or 7b), it can be easily determined that the classifier has slightly equal confusion with classes $C_0$, $C_1$, $C_4$ to $C_6$, and with the no-label (NPL) prediction as the FN to class $C_8$. Furthermore, from column $C_8$ it can be observed that a few elements belong to classes $C_0$, $C_1$, and $C_5$ to $C_7$ were classified incorrectly to class $C_8$ and were counted as FP to class $C_8$. For ECG data set, there is no element with no label assigned to it, therefore all cells of the last row (NTL) of the MLCM are zero.

For the results of applying MLCM on Movie Posters, from Table 12 it can be determined that classes $C_7$ and $C_4$, which represent the genres Drama and Comedy, respectively, have the most majority of FP predictions knowing that the majority of data were labeled with Drama and Comedy. Classes $C_{14}$ and $C_{16}$ (for genres Romance and Thriller, respectively) have the second most majority of FP predictions. In other words, the classifier has FN prediction distributed mostly on classes $C_7$, $C_4$, $C_{14}$, and $C_{16}$ while expected to predict other classes. The results for this experiment reveal some characteristics of this data set and the classifier, such as the data set being imbalanced and/or specific insight for setting the classifier's hyper-parameters. Accordingly, the data from the MLCM may be applied to define a weight matrix for the dataset.

The algorithm used by sklearn to create the one-vs-rest confusion matrix for multi-label classification is incomplete for multi-label classification. This can be seen by comparing the one-vs-rest confusion matrix shown in Table 9 with the results extracted from MLCM shown in Table 8. The summation of FN for all classes and the summation of FP for all classes reported by sklearn were 216 and 135, respectively. These two numbers should be equal, since the definition of FN and FP in confusion matrices specifies that an instance of FN for a class is an instance of FP to another class and therefore the summations over all classes should be equal. This demonstrates the incorrect accounting of FN and FP by sklearn. By contrast, the extracted statistics from MLCM show the summation of FN for all classes and the summation of FP for all classes are both equal to 243, which follows the fundamental concept of confusion matrix for multiple classes.

The summation of TN for all classes was also divided to the summation of TP for all classes, which resulted in 10.45 for the sklearn method and 9.00 for the MLCM method. The result of dividing the total-TN to the total-TP using extracted statistics from MLCM is equal to the number of classes (q) as expected, but the result of division using results from sklearn is meaningless.

Using the TP, TN, FP, and FN extracted from MLCM precision, recall, and F1-score were calculated for each class, as well as micro, macro, and weighted average over all classes. Table 11 shows the calculated results incorporating all combinations of true and predicted labels for MLCM, providing an accurate and complete assessment of the underlying ECG classifier.

The summation of each row in Table 7a (illustrated in the weight column of Table 11) is unmatched with the numbers in the support column of Table 10. This difference is because the method for creating Table 10 focuses on counting the elements with the true labels, which, in the case of the multi-class confusion matrix (not MLCM), will be equal to the summation of the same row of the confusion matrix. In other words, the summation of each row in the multi-class confusion matrix is equal to the number of elements in the corresponding class, but the summation of each row in MLCM is rarely equal and mostly greater than the number of elements in the corresponding class. This is the consequence of increasing MLCM cells for both situations of under and over prediction where both are counted as FN to the corresponding class, which is ignored in the one-vs-rest confusion matrix created by sklearn library.

The MLCM methods described herein may count more than one FN/FP for each element of a multi-label data set for incorrect prediction(s) while there is only one FN/FP for incorrect prediction of each element of a multi-class data set. Counting more than one FN/FP provides an accurate representation of the combination of true and predicted labels in a multi-label data set where each element may be assigned with more than one label, which could be interpreted as more than one element. Applying the MLCM methods described herein on multi-class data sets returns exactly the same confusion matrix that the multi-class confusion matrix algorithm produces.

The MLCM methods described herein allow the distribution of FN predictions over each class to be identified concisely, enabling the situations where the classifier has the most confusion to be easily and accurately identified. This allows the model to be improved by focusing on the classes that have the most confusion for the classifier and address the problem by examining the source data, extracted features, or the configuration of the classifier. In addition, MLCM can be used to create a weight matrix for the cost-sensitive loss metrics (see e.g. C. Elkan, "The foundations of cost-sensitive learning," in *Proc.* 17*th Int. Joint Conf. Artif. Intell.* (*IJCAI*), 2001, pp. 973 978), especially in the case of imbalanced data sets.

Trust and explainability are other important considerations in developing and implementing a machine learning model. Consider the scenario where the user of a classifier wants to know the level of trust for the classifier in, for example, a disease classification. One way of measuring trust and/or explainability is to quantify the overlap of incorrect predictions of a class with classes of the same or different category (e.g., based on the cause and/or treatment for the labeled disease), which is possible using the MLCM methods described. This can provide users with increased confidence in the use and application of a multi-label classifier.

The present invention has been described here by way of example only, while numerous specific details are set forth herein in order to provide a thorough understanding of the examples shown and described herein. However, it will be understood by those of ordinary skill in the art that these examples may, in some cases, be practiced without these specific details. In other instances, well-known methods, procedures and components have not been described in detail so as not to obscure the description of the examples. Various modification and variations may be made to these examples without departing from the spirit and scope of the invention, which is limited only by the appended claims.

We claim:

1. A method of evaluating a multi-label classification machine learning model, the method comprising:

receiving, by a processor, a model labelled dataset from the machine learning model, wherein the model labelled dataset comprises a plurality of data elements and a plurality of model predicted labels, wherein each data element in the model labelled dataset is associated by the machine learning model with zero or more model predicted labels, wherein each model predicted label is selected from amongst a plurality of potential labels, wherein the plurality of potential labels corresponds to q potential classes;

defining, by the processor, a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label;

generating, by the processor, a populated multi-label confusion matrix for the machine learning model by comparing the model labelled dataset and a true labelled dataset, wherein the true labelled dataset comprises the plurality of data elements and a plurality of true labels, wherein each data element in the true labelled dataset is associated with zero or more true labels, wherein each true label is selected from amongst the plurality of potential labels;

calculating, by the processor, at least one performance metric for the machine learning model from the populated multi-label confusion matrix; and outputting, by the processor, the at least one performance metric.

2. The method of claim 1, wherein the populated multi-label confusion matrix is generated by:

for each data element in the plurality of data elements:

determining an element-specific combination of true and predicted labels by comparing the zero or more model predicted labels associated with that data element with zero or more true labels associated with that data element in a true labelled dataset; and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category.

3. The method of claim 2, wherein generating the populated multi-label confusion matrix comprises:

for each correctly predicted true label in each element-specific combination of true and predicted labels, incrementing a matrix entry in the populated multi-label confusion matrix at the row and column location corresponding to that predicted label and true label; and for each element-specific combination of true and predicted labels that contains zero true labels and zero predicted labels, incrementing a matrix entry in the populated multi-label confusion matrix at the row and column location corresponding to the no true label row and the no predicted label column.

4. The method of claim 2, wherein:

the plurality of label combination categories comprises a first category, a second category, and a third category;

each data element in the model labelled dataset for which each of the zero or more model predicted labels associated with that data element corresponds to a true label associated with that data element in the true labelled dataset is assigned to the first category;

each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, is assigned to the second category;

each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, is assigned to the third category.

5. The method of claim 4, wherein the category specific incrementation algorithm for the first category comprises, for each true label in each element-specific combination of true and predicted labels where that element-specific combination of true and predicted label omits a corresponding predicted label, incrementing a matrix entry in the populated multi-label confusion matrix at the row location corresponding to the potential label associated with that true label of the no predicted label column.

6. The method of claim 4, wherein the category specific incrementation algorithm for the second category comprises:

for each predicted label in each element-specific combination of true and predicted labels where that element-specific combination of true and predicted label omits a corresponding true label, incrementing a matrix entry in the populated multi-label confusion matrix at every row location corresponding to any true label for the corresponding data element of the column corresponding to that predicted label; and for each predicted label in each element-specific combination of true and predicted labels that omits any and all true labels, incrementing a matrix entry in the populated multi-label confusion matrix at the no true label row of the column corresponding to that predicted label.

7. The method of claim 4, wherein the category specific incrementation algorithm for the third category comprises, for each predicted label in each element-specific combination of true and predicted labels where that element-specific combination of true and predicted label omits a corresponding true label, incrementing a matrix entry in the populated multi-label confusion matrix at every row location corresponding to one of the true labels in the at least one true label associated with that data element for which the element-specific combination of true and predicted label omits a corresponding predicted label of the column corresponding to that predicted label.

8. The method of claim 1, further comprising generating at least one model improvement recommendation based on the at least one performance metric, and outputting the at least one model improvement recommendation.

9. The method of claim 8, further comprising:

receiving a second model labelled dataset from a second multi-label classification machine learning model, wherein the second model labelled dataset comprises the plurality of data elements and a second plurality of model predicted labels;

defining a second multi-label confusion matrix for the second multi-label classification machine learning model;

generating a second populated multi-label confusion matrix for the second multi-label classification machine learning model;

calculating the at least one performance metric for the second multi-label classification machine learning model from the second populated multi-label confusion matrix; and comparing the at least one performance metric for the second multi-label classification machine learning model and the at least one performance metric for the machine learning model;

wherein generating the at least one model improvement recommendation comprises identifying a preferred model based on comparing the at least one performance metric for the second multi-label classification machine learning model and the at least one performance metric for the machine learning model.

10. The method of claim 8, wherein generating at least one model improvement recommendation comprises:

identifying, based on the at least one performance metric, at least one particular class of the q potential classes for which the machine learning model is underperforming relative to the other potential classes.

11. A system for evaluating a multi-label classification machine learning model, the system comprising:

a processor; and a non-transitory storage medium having stored thereon a true labelled dataset, wherein the true labelled dataset comprises a plurality of data elements and a plurality of true labels, wherein each data element in the true labelled dataset is associated with zero or more true labels, wherein each true label is selected from amongst a plurality of potential labels, wherein the plurality of potential labels corresponds to q potential classes;

wherein the processor is configured to:

receive a model labelled dataset from the machine learning model, wherein the model labelled dataset comprises the plurality of data elements and a plurality of model predicted labels, wherein each data element in the model labelled dataset is associated by the machine learning model with zero or more model predicted labels, wherein each model predicted label is selected from amongst the plurality of potential labels;

define a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label;

generate a populated multi-label confusion matrix for the machine learning model by comparing the model labelled dataset and the true labelled dataset;

calculate at least one performance metric for the machine learning model from the populated multi-label confusion matrix; and output the at least one performance metric.

12. The system of claim 11, wherein the processor is further configured to generate the populated multi-label confusion matrix by:

for each data element in the plurality of data elements:

determining an element-specific combination of true and predicted labels by comparing the zero or more model predicted labels associated with that data element with zero or more true labels associated with that data element in a true labelled dataset; and assigning that data element to a label combination category from amongst a plurality of label combination categories based on the element-specific combination of true and predicted label; and for each label combination category, incrementing values in the multi-label confusion matrix by applying a category specific incrementation algorithm to the element-specific combination of true and predicted labels for each data element assigned to that label combination category.

13. The system of claim 12, wherein the processor is configured to generate the populated multi-label confusion matrix by:

for each correctly predicted true label in each element-specific combination of true and predicted labels, incrementing a matrix entry in the populated multi-label confusion matrix at the row and column location corresponding to that predicted label and true label; and for each element-specific combination of true and predicted labels that contains zero true labels and zero predicted labels, incrementing a matrix entry in the populated multi-label confusion matrix at the row and column location corresponding to the no true label row and the no predicted label column.

14. The system of claim 12, wherein:

the plurality of label combination categories comprises a first category, a second category, and a third category; and the processor is configured to:

assign each data element in the model labelled dataset for which each of the zero or more model predicted labels associated with that data element corresponds to a true label associated with that data element in the true labelled dataset to the first category;

assign each data element in the model labelled dataset for which i) the zero or more model predicted labels associated with that data element includes each and every true label associated with that data element in the true labelled dataset, and ii) the zero or more model predicted labels associated with that data element includes at least one additional predicted label that is not a true label associated with that data element in the true labelled dataset, to the second category;

assign each data element in the model labelled dataset for which i) the zero or more model predicted labels associated with that data element omits at least one true label associated with that data element in the true labelled dataset, and ii) the zero or more model predicted labels associated with that data element includes at least one additional predicted label that is not a true label associated with that data element in the true labelled dataset, to the third category.

15. The system of claim 14, wherein the processor is configured to implement the category specific incrementation algorithm for the first category by, for each true label in each element-specific combination of true and predicted labels where that element-specific combination of true and predicted label omits a corresponding predicted label, incrementing a matrix entry in the populated multi-label confusion matrix at the row location corresponding to the potential label associated with that true label of the no predicted label column.

16. The system of claim 14, wherein the processor is configured to implement the category specific incrementation algorithm for the second category by:

for each predicted label in each element-specific combination of true and predicted labels where that element-specific combination of true and predicted label omits a corresponding true label, incrementing a matrix entry in the populated multi-label confusion matrix at every row location corresponding to any true label for the corresponding data element of the column corresponding to that predicted label; and for each predicted label in each element-specific combination of true and predicted labels that omits any and all true labels, incrementing a matrix entry in the populated multi-label confusion matrix at the no true label row of the column corresponding to that predicted label.

17. The system of claim 14, wherein the processor is configured to implement the category specific incrementation algorithm for the third category by, for each predicted label in each element-specific combination of true and predicted labels where that element-specific combination of true and predicted label omits a corresponding true label, incrementing a matrix entry in the populated multi-label confusion matrix at every row location corresponding to one of the true labels in the at least one true label associated with that data element for which the element-specific combination of true and predicted label omits a corresponding predicted label of the column corresponding to that predicted label.

18. The system of claim 12, wherein the processor is configured to generate at least one model improvement recommendation based on the at least one performance metric, and output the at least one model improvement recommendation.

19. The system of claim 18, wherein the processor is configured to:

receive a second model labelled dataset from a second multi-label classification machine learning model, wherein the second model labelled dataset comprises the plurality of data elements and a second plurality of model predicted labels;

define a second multi-label confusion matrix for the second multi-label classification machine learning model;

generate a second populated multi-label confusion matrix for the second multi-label classification machine learning model;

calculate the at least one performance metric for the second multi-label classification machine learning model from the second populated multi-label confusion matrix;

compare the at least one performance metric for the second multi-label classification machine learning model and the at least one performance metric for the machine learning model; and generate the at least one model improvement recommendation by identifying a preferred model based on comparing the at least one performance metric for the second multi-label classification machine learning model and the at least one performance metric for the machine learning model.

20. The system of claim 18, wherein the processor is configured to generate the at least one model improvement recommendation by:

identifying, based on the at least one performance metric, at least one particular class of the q potential classes for which the machine learning model is underperforming relative to the other potential classes.

21. A computer program product comprising a non-transitory computer-readable storing computer executable instructions, the computer executable instructions for configuring a processor to perform a method of evaluating a machine learning model, wherein the method comprises:

receiving a model labelled dataset from the machine learning model, wherein the model labelled dataset comprises a plurality of data elements and a plurality of model predicted labels, wherein each data element in the model labelled dataset is associated by the machine learning model with zero or more model predicted labels, wherein each model predicted label is selected from amongst a plurality of potential labels, wherein the plurality of potential labels corresponds to q potential classes;

defining a multi-label confusion matrix for the machine learning model, wherein the multi-label confusion matrix comprises q+1 rows and q+1 columns, the q+1 rows comprise q rows for true labels wherein each of the rows in the q rows corresponds to one of the potential labels and 1 row for no true label, and the q+1 columns comprise q columns for predicted labels wherein each of the columns in the q columns corresponds to one of the potential labels and 1 column for no predicted label;

generating a populated multi-label confusion matrix for the machine learning model by comparing the model labelled dataset and a true labelled dataset, wherein the true labelled dataset comprises the plurality of data elements and a plurality of true labels, wherein each data element in the true labelled dataset is associated with zero or more true labels, wherein each true label is selected from amongst the plurality of potential labels;

calculating at least one performance metric for the machine learning model from the populated multi-label confusion matrix; and outputting the at least one performance metric.

* * * * *